(12) United States Patent
Watanabe

(10) Patent No.: US 8,531,623 B2
(45) Date of Patent: Sep. 10, 2013

(54) DISPLAY DEVICE

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 36 days.

(21) Appl. No.: 13/147,371

(22) PCT Filed: Feb. 2, 2010

(86) PCT No.: PCT/JP2010/000615
§ 371 (c)(1),
(2), (4) Date: Aug. 2, 2011

(87) PCT Pub. No.: WO2010/089998
PCT Pub. Date: Aug. 12, 2010

(65) Prior Publication Data
US 2011/0285934 A1  Nov. 24, 2011

(30) Foreign Application Priority Data
Feb. 6, 2009 (JP) .................................. 2009-026783

(51) Int. Cl.
*G02F 1/1333* (2006.01)
(52) U.S. Cl.
USPC .......................................................... 349/58
(58) Field of Classification Search
None
See application file for complete search history.

(56) References Cited

U.S. PATENT DOCUMENTS

| 5,656,893 | A | 8/1997 | Shino et al. |
| 2004/0041504 | A1 | 3/2004 | Ozolins et al. |
| 2004/0051944 | A1 | 3/2004 | Stark |
| 2005/0162583 | A1 | 7/2005 | Ozolins et al. |
| 2006/0001796 | A1 | 1/2006 | Chang et al. |
| 2010/0259566 | A1 | 10/2010 | Watanabe |
| 2011/0102302 | A1 | 5/2011 | Watanabe et al. |
| 2011/0109535 | A1 | 5/2011 | Watanabe et al. |
| 2011/0242686 | A1 | 10/2011 | Watanabe |

FOREIGN PATENT DOCUMENTS

| EP | 0 680 067 A2 | 11/1995 |
| JP | 05-188873 A | 7/1983 |
| JP | 63-61886 U | 4/1988 |
| JP | 02-275490 A | 11/1990 |
| JP | 04-128862 A | 4/1992 |

(Continued)

OTHER PUBLICATIONS

Official Communication issued in International Patent Application No. PCT/JP2010/000615, mailed on Mar. 30, 2010.

(Continued)

*Primary Examiner* — Lucy Chien
(74) *Attorney, Agent, or Firm* — Keating & Bennett, LLP

(57) ABSTRACT

A direct-viewing type display device 100A includes: a display panel which has a display region 10A and a frame region 10F provided outside the display region; and a light-transmitting cover 20 provided on a viewer's side of the display panel. The light-transmitting cover includes a lens portion 22 positioned so as to overlap a region that includes part of the frame region of the display panel and part of a peripheral display region 10D within the display region which adjoins the part of the frame region. The display device further includes a housing 30 which has a housing portion 36 provided at least on a side surface 10b of the display panel. Part of light going out from the part of the peripheral display region and/or part of light entering the housing portion on a rear side goes out on a viewer's side of the housing portion 36. According to the present invention, a direct-viewing type display device is provided which includes a sole display panel and in which the frame is visually obscured.

7 Claims, 21 Drawing Sheets

(56) References Cited

FOREIGN PATENT DOCUMENTS

| | | |
|---|---|---|
| JP | 05-143007 A | 6/1993 |
| JP | 08-063110 A | 3/1996 |
| JP | 2004-524551 A | 8/2004 |
| JP | 2006-517302 A | 7/2006 |
| JP | 2006-276580 A | 10/2006 |
| WO | 2008/149449 A1 | 12/2008 |
| WO | 2009/066436 A1 | 5/2009 |
| WO | 2009/157150 A1 | 12/2009 |
| WO | 2009/157161 A1 | 12/2009 |

OTHER PUBLICATIONS

English translation of Official Communication issued in corresponding International Application PCT/JP2010/000615, mailed on Sep. 22, 2011.

Watanabe et al.; "Display Device"; U.S. Appl. No. 13/265,157, filed Oct. 19, 2011.

Official Communication issued in corresponding European Patent Application No. 10738339.0, mailed on Aug. 21, 2012.

DISPLAY DEVICE

TECHNICAL FIELD

The present invention relates to a display device and particularly to a direct-viewing type display device.

BACKGROUND ART

A liquid crystal display device includes a liquid crystal display panel, a backlight device, circuits for supplying various electrical signals to the liquid crystal display panel, and a power supply, as well as a housing for accommodating these components. The liquid crystal display panel has a display region in which a plurality of pixels are arrayed and a frame region surrounding the display region. In the display region, pixel electrodes and TFTs are provided. In the frame region, a sealing portion, an implementation of driving circuitry, etc., are provided. Since no pixels are arrayed in the frame region, the frame region does not contribute to displaying. The frame region of the existing liquid crystal display devices has been decreasing, although the frame region itself cannot be omitted in principle.

When constructing a large screen by arraying a plurality of display panels, joints will occur in an image displayed on the large screen because the frame regions of the display panels do not contribute to displaying. Patent Documents 1 and 2 disclose display devices which have a light-transmitting cover provided on the viewer's side of the display panel in order to display a jointless image. An edge portion of the light-transmitting cover includes a portion in which the viewer-side surface is curved. The curved portion functions as a lens, and therefore will be referred to as a "lens portion" hereinafter. The lens portion of the light-transmitting cover is provided so as to overlap the frame region of the display panel and a portion of a region of the display region adjoining the frame region. A portion of the display region that overlaps the lens portion will be referred to as a "peripheral display region". Light which goes out from pixels which are arrayed in the peripheral display region is refracted by the lens portion toward the frame region. As a result, an image is also displayed on the front face of the frame region, so that a jointless image is displayed on the entire screen.

Patent Document 3 discloses a display device which has a circular or oval shape.

CITATION LIST

Patent Literature

Patent Document 1: Japanese Laid-Open Patent Publication No. 5-188873
Patent Document 2: Japanese PCT National Phase Laid-Open Publication No. 2004-524551
Patent Document 3: Japanese Laid-Open Patent Publication No. 2006-276580

SUMMARY OF INVENTION

Technical Problem

The present inventor conducted research for a novel single-panel display device in which the frame is visually obscured.

When the light-transmitting cover having the lens portion which is disclosed in Patent Document 1 or 2 is positioned such that the lens portion extends over the frame region of the display panel, the frame region of the display panel is visually obscured. However, the display panel is contained in a housing, and accordingly, part of the housing is present outside the frame region of the display panel. Therefore, even when the frame region is visually obscured by means of the lens portion, part of the housing which is present outside the frame region is visually recognized. That is, part of the housing is seen as if it was a frame. Among the existing display devices, there is no display device proposed in which the housing is also visually obscured. Although the liquid crystal display device has been described above, flat panel displays, such as plasma displays (PDP), organic EL display devices, and electrophoretic display devices, also have the frame region. This frame region can be visually obscured by applying the above-described solution, although visually obscuring the housing is not proposed.

One of the objects of the present invention is to provide a direct-viewing type display device which includes a sole display panel and in which the frame is visually obscured.

Solution to Problem

A direct-viewing type display device of the present invention includes: a display panel which has a display region and a frame region provided outside the display region; and a light-transmitting cover provided on a viewer's side of the display panel; wherein the light-transmitting cover includes a lens portion positioned so as to overlap a region that includes part of the frame region of the display panel and part of a peripheral display region within the display region which adjoins the part of the frame region, the display device further includes a housing which has a housing portion provided at least on a side surface of the display panel, and part of light going out from the part of the peripheral display region and/or light entering the housing portion on a rear side goes out on a viewer's side of the housing portion.

In one embodiment, the housing portion is capable of transmitting light, and an outer end surface of the housing portion is located at an outer position relative to an outer edge of the lens portion of the light-transmitting cover.

In one embodiment, the lens portion of the light-transmitting cover is arranged such that an outer edge of the lens portion is present on a viewer's side of the outer end surface of the housing portion.

In one embodiment, the housing and the light-transmitting cover are integrally formed.

In one embodiment, the housing and the light-transmitting cover are integrally formed, and at least part of a viewer-side surface and a rear-side surface of the housing portion is a lens surface.

In one embodiment, the housing portion is provided such that the viewer-side surface of the housing portion and the view side surface of the lens portion form a boundary therebetween, the boundary is on a viewer's side of the part of the frame region, and the viewer-side surface of the housing portion is a lens surface.

In one embodiment, an image formed at least in part of the display region which is exclusive of the peripheral display region is an image of a different content type from an image formed in the part of the peripheral display region.

In one embodiment, at least one of a viewer-side surface of the lens portion of the light-transmitting cover and the other surface of the lens portion opposite to the viewer-side surface is a curved surface.

In one embodiment, at least one of the viewer-side surface of the lens portion of the light-transmitting cover and the other surface of the lens portion opposite to the viewer-side surface is a cylindrical curved surface.

In one embodiment, a ling of intersection between at least one of the viewer-side surface of the lens portion of the light-transmitting cover and the other surface of the lens portion opposite to the viewer-side surface and a plane which is perpendicular to a display surface of the display panel is a curve which is defined by an aspherical function.

In one embodiment, at least one of the viewer-side surface of the lens portion and the other surface of the lens portion opposite to the viewer-side surface has a Fresnel lens shape.

In one embodiment, the viewer-side surface of the housing portion is a curved surface, and the viewer-side surface of the housing portion is configured such that the distance from a plane which is parallel to the display surface of the display panel decreases along the direction from the perimeter to the center.

In one embodiment, at least one of a viewer-side surface and a rear-side surface of the housing portion is a curved surface.

In one embodiment, at least one of a viewer-side surface and a rear-side surface of the housing portion is parallel to the display surface of the display panel.

In one embodiment, a viewer-side surface of the housing portion is a Fresnel lens surface.

In one embodiment, the light-transmitting cover and the housing portion are secured with a transparent adhesive tape.

In one embodiment, the housing further includes a bottom housing portion provided on a rear side of the display panel, and the housing portion and the bottom housing portion are secured on the rear side of the display panel.

In one embodiment, the display panel has a circular shape.

In one embodiment, the display panel has a rectangular shape.

A mobile phone of the present invention includes a display device which has the above-described configuration.

In one embodiment, the rear environment is displayed on a display region of the display panel.

In one embodiment, the light-transmitting cover includes a flat portion which is exclusive of the lens portion, a viewer-side surface of the flat portion being formed by a flat surface which is generally parallel to the display surface of the display panel, and at least one of the viewer-side surface of the lens portion, the viewer-side surface of the flat portion, and the viewer-side surface of the housing portion is provided with an antireflection treatment.

In one embodiment, at least one of the viewer-side surface of the lens portion, the viewer-side surface of the flat portion, and the viewer-side surface of the housing portion is provided with an antireflection film.

In one embodiment, the antireflection treatment is an LR treatment.

In one embodiment, the antireflection film has a motheye structure.

In one embodiment, the antireflection film is a dielectric multilayer film.

In one embodiment, in the display region of the display panel, a plurality of pixels are arranged at an equal interval along the first and second directions, the display region is constituted of the peripheral display region and a central display region which is exclusive of the peripheral display region, and a display signal which is to be supplied to pixels arranged in the peripheral display region is compressed along the second direction relative to a display signal which is to be supplied to pixels arranged in the central display region.

In one embodiment, the display device of the present invention further includes a backlight device which is configured to emit light toward the display panel, the intensity of light which is to be emitted toward the pixels arranged in the peripheral display region is higher than the intensity of light which is to be emitted toward the pixels arranged in the central display region.

A digital photo frame of the present invention includes the display panel, the light-transmitting cover, and the housing portion.

Advantageous Effects of Invention

The present invention provides a direct-viewing type display device which includes a sole display panel and in which the frame is visually obscured.

BRIEF DESCRIPTION OF DRAWINGS

FIG. 32 is a schematic cross-sectional view of an edge portion of the liquid crystal display device 500a.

DESCRIPTION OF EMBODIMENTS

Hereinafter, embodiments of the present invention will be described with reference to the drawings. The present invention is not limited to the embodiments which will be exemplified below.

Figure 1:
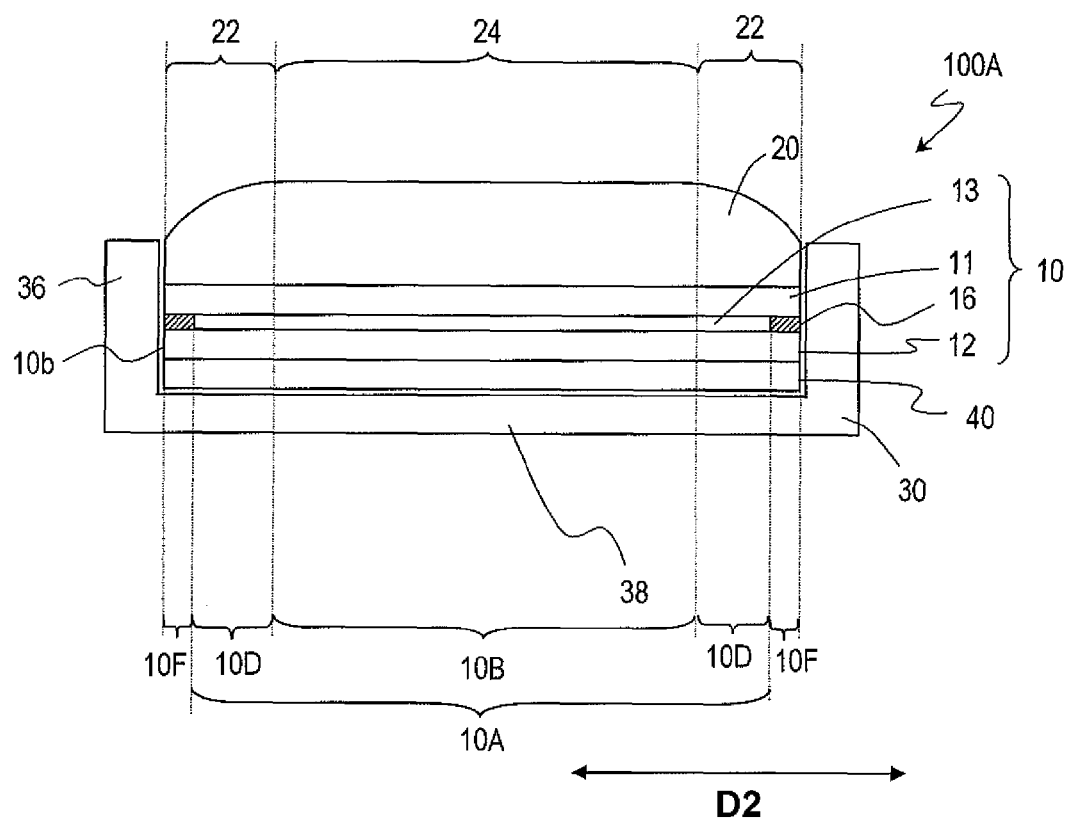
FIG. 1 A schematic cross-sectional view of a display device 100A of an embodiment of the present invention.

FIG. 1 is a schematic cross-sectional view of a direct-viewing type liquid crystal display device 100A that is an embodiment of the present invention.

As shown in FIG. 1, the liquid crystal display device 100A includes a sole liquid crystal display panel 10, a light-transmitting cover 20 provided on the viewer's side of the liquid crystal display panel 10, and a housing 30.

The liquid crystal display panel 10 includes a display region 10A and frame regions 10F which are provided outside the display region 10A. The liquid crystal display panel 10 may be any type of known transmissive liquid crystal display panel. Under the liquid crystal display panel 10, a backlight device 40 is provided. Note that the backlight device is not necessary when the display panel is a self-light-emitting type display panel, such as an organic EL display panel or the like.

The light-transmitting cover 20 includes lens portions 22 and a flat portion 24. The lens portions 22 of the light-transmitting cover 20 are positioned so as to overlap regions which include the frame regions 10F of the liquid crystal display panel 10 and peripheral display regions 10D that are parts of the display region 10A adjoining the frame regions 10F. Light going out from the peripheral display regions 10D are refracted by the lens portions 22, whereby images formed in the peripheral display regions 10D are enlarged so as to be displayed over regions constituted of the peripheral display regions 10D and the frame regions 10F. Although the liquid crystal display panel 10 includes the frame regions 10F, the frame regions 10F can be visually obscured by providing the light-transmitting cover 20 that has the lens portions 22 on the viewer's side of the liquid crystal display panel 10.

The housing 30 is provided to protect the liquid crystal display panel 10. Since the display device of the present embodiment includes the housing 30, the display panel is prevented from being exposed to dust or water. The display panel is also prevented from undergoing a direct impact. Hereinafter, part of the housing is referred to as "housing portion". The housing 30 includes lateral housing portions 36 and a bottom housing portion 38. The lateral housing portions 36 are capable of transmitting light and are provided on side surfaces 10b of the liquid crystal display panel 10. The bottom housing portion 38 is provided under the backlight device 40.

Since the lateral housing portions 36 are capable of transmitting light, part of light entering the lateral housing portions 36 on their rear side goes out from the viewer's side of the lateral housing portions 36. Therefore, the rear environment behind the lateral housing portions 36 is visible to the viewer therethrough. Thus, a display device can be realized in which the frame is visually obscured.

Hereinafter, why the frame of the liquid crystal display device 100A is visually obscured is described in more detail with reference to FIG. 2 and FIG. 3.

Figure 2:
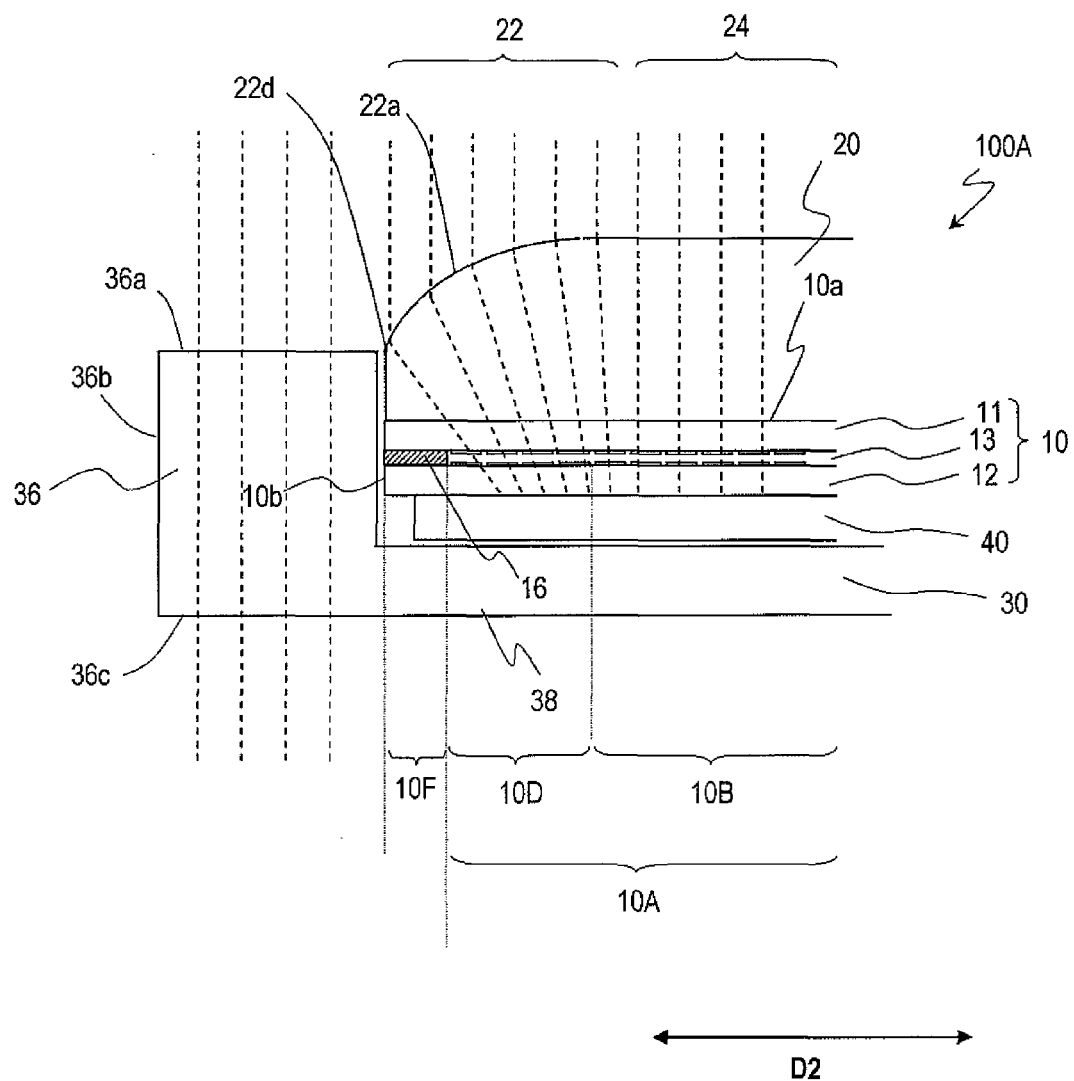
FIG. 2 An enlarged cross-sectional view schematically showing part of the liquid crystal display device 100A near an edge portion.

FIG. 2 is an enlarged cross-sectional view schematically showing part of the liquid crystal display device 100A near an edge portion.

The liquid crystal display panel 10 has a rectangular shape. In the display region 10A, a plurality of pixels are arrayed in a matrix of rows and columns. The display region 10A includes the peripheral display region 10D that adjoins the frame region 10F and a central display region 10B that forms part of the display region other than the peripheral display region 10D. Here, the row direction is referred to as "first direction D1" (that is identical with the direction vertical to the sheet of FIG. 2, which is shown in FIG. 3 described later), and the column direction is referred to as "second direction D2".

The liquid crystal display panel 10 includes an upper substrate 11 and a lower substrate 12. The liquid crystal display panel 10 further includes a liquid crystal layer 13 between the upper substrate 11 and the lower substrate 12. The lower substrate 12 has, for example, TFTs and pixel electrodes. The upper substrate 11 has, for example, a color filter layer and a counter electrode. The upper side of the upper substrate 11 and the lower side of the lower substrate 12 are provided with polarizers as necessary. The frame region 10F of the liquid crystal display panel 10 includes a sealing portion 16, a driving circuit, etc. The backlight device 40 is an edge-light type backlight device which includes, for example, an LED, a light guide plate, and an optical sheet, such as a diffuser, a prism sheet, or the like.

The lens portion 22 of the light-transmitting cover 20 is positioned so as to overlap a region which includes the frame region 10F and the peripheral display region 10D of the liquid crystal display panel 10. The viewer-side surface 22a of the lens portion 22 (also referred to as "outgoing face") is a curved surface. The flat portion 24 is positioned so as to overlap the central display region 10B. The outgoing face of the flat portion 24 is parallel to a display surface 10a of the liquid crystal display panel 10. The light-transmitting cover 20 has a rectangular shape. The lens portions 22 are provided at two out of the four sides of the light-transmitting cover 20 extending in the first direction D1.

The lateral housing portions 36 of the housing 30 are capable of transmitting light and are provided outside the side surfaces at two out of the four sides of the liquid crystal display panel 10 extending in the first direction D1. The viewer-side surface 36a and the rear-side surface 36c of the lateral housing portions 36 are parallel to the display surface 10a of the liquid crystal display panel 10.

In FIG. 2, broken lines represent light rays which go out from the pixels arrayed in the display region 10A to enter the light-transmitting cover 20 and light rays which enter the lateral housing portion 36 on its rear side. As shown in FIG. 2, light rays going out from the peripheral display region 10D enter the lens portion 22 and are refracted outwardly (toward the frame region 10F side). Here, the light rays entering the lens portion 22 are refracted at the viewer-side surface 22a of the lens portion 22 and go out from the viewer-side surface 22a of the lens portion 22 provided over the peripheral display region 10D and the frame region 10F. The light rays going out from the viewer-side surface 22a of the lens portion travel straight in a direction perpendicular to the display surface 10a. Therefore, an image formed in the peripheral display region 10D of the liquid crystal display panel 10 is enlarged so as to be displayed in a region constituted of the peripheral display region 10D and the frame region 10F, so that the frame region 10F is visually obscured. Meanwhile, light rays going out from the pixels arrayed in the central display region 10B enter the flat portion 24 and travel straight in a direction perpendicular to the display surface 10a. Therefore, on the viewer's side of the flat portion 24, an image formed in the central display region 10B is displayed. Light rays entering the lateral housing portion 36 at the rear-side surface 36c of the lateral housing portion 36 travel straight through the lateral housing portion 36 in a direction perpendicular to the rear-side surface 36c and go out from the viewer-side surface 36a. Therefore, the rear environment behind the lateral housing portion 36 is visible to the viewer therethrough. Thus, a display device is realized in which the frame (the frame region 10F and the lateral housing portion 36) is visually obscured.

The lens portions 22 are provided on frame regions at the two sides extending in the first direction D1, so that part of the image is displayed on the frame regions 10F at the two sides extending in the first direction D1. The lateral housing portions 36 are provided outside the two sides of the liquid crystal display panel 10 extending in the first direction D1, so that the rear environment behind the lateral housing portions 36 outside the two sides of the liquid crystal display panel 10 extending in the first direction D1 is visible to the viewer through the lateral housing portions 36. Therefore, in the liquid crystal display device 100A, the frame portions at the two sides extending in the first direction D1 are visually obscured.

Figure 3:
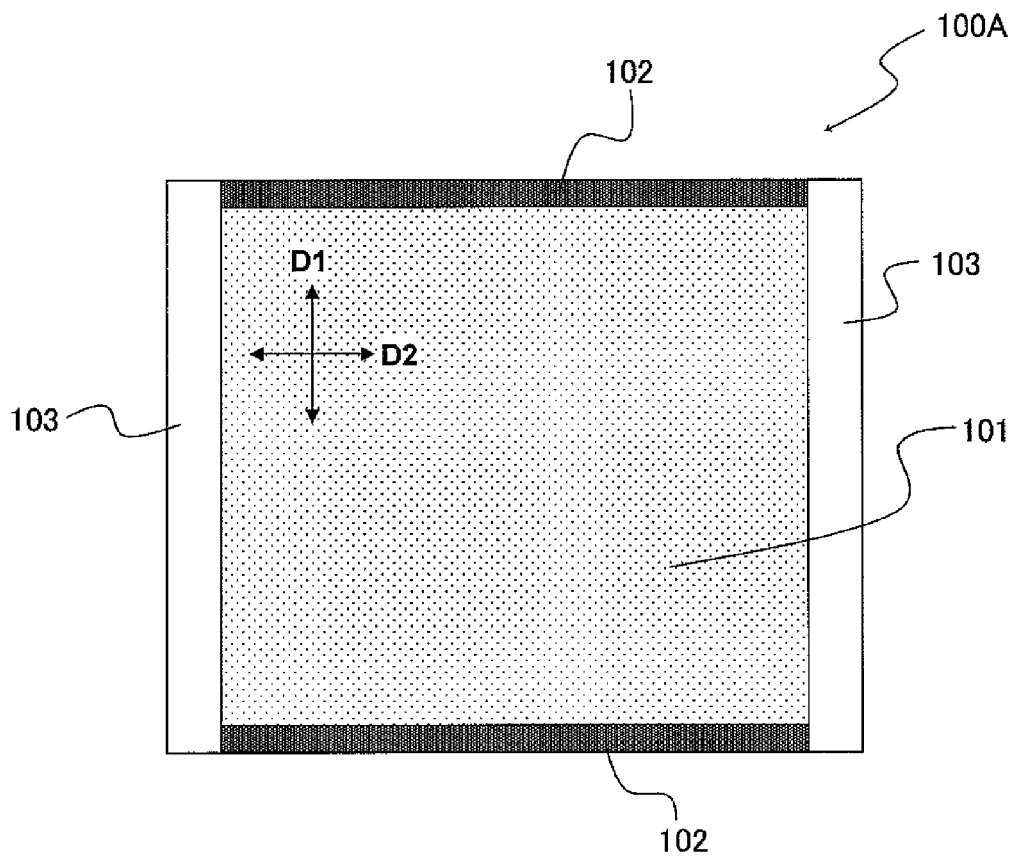
FIG. 3 A diagram schematically showing the liquid crystal display device 100A, which is seen from the viewer's side.

FIG. 3 schematically shows the liquid crystal display device 100A, which is seen from the viewer's side. FIG. 3 shows a region 101 in which an image is to be displayed, regions 102 in which the frame is visually recognized, and regions 103 in which the rear environment is visible therethrough. As shown in FIG. 3, the frame portions at the two sides extending in the second direction D2 are visually recognized (the regions 102 in which the frame is visually recognized). On the other hand, through the frame portions at the two sides extending in the first direction D1, the rear environment behind the lateral housing portions 36 is visible therethrough (the regions 103 in which the rear environment is visible therethrough). Thus, in the liquid crystal display device 100A, the frame portions at the two sides extending in the first direction D1 can be visually obscured.

In the above-described embodiment, the rear environment is visible through the lateral housing portions on the viewer's side of the lateral housing portions, although the frame can be visually obscured by displaying part of the image formed in the display region on the viewer's side of the lateral housing portions. When part of light going out from the display region is allowed to go out on the viewer's side of the lateral housing portions, part of the image is displayed on the viewer's side of the lateral housing portions. For example, in the above-described embodiment, light going out from the peripheral display region is refracted outwardly so that part of the image is displayed on the frame region of the display panel. However, by refracting the light going out from the peripheral display region more outwardly, part of the image formed in the peripheral display region can be displayed on the viewer's side of the lateral housing portions. Further, by a configuration where a region in which part of the image is displayed and a region in which the rear environment is visible therethrough are present on the viewer's side of the lateral housing portions, the frame can also be visually obscured. By allowing part of light going out from the display region and light entering the lateral housing portions on their rear side to go out on the viewer's side of the lateral housing portions, a region in which the rear environment is visible therethrough and a region in which the image is displayed can be present on the viewer's side of the lateral housing portions. An example of the display device where part of the image is displayed on the viewer's side of the lateral housing portions, and an example of the display device where a region in which part of the image is displayed and a region in which the rear environment is visible therethrough are present on the viewer's side of the lateral housing portions, will be described later in detail.

The bottom housing portion 38 of the housing 30 may be a separate element from the lateral housing portions 36 or, alternatively, may be omitted. In either of these cases, the effects of the present invention are not marred. The bottom housing portion 38 does not contribute to display and therefore may not be capable of transmitting light. Although the viewer-side surface 36a and the rear-side surface 36c of the lateral housing portions 36 are flat surfaces which are parallel to the display surface 10a, the shape of the viewer-side surface and the rear surface of the lateral housing portions are not limited to this shape. Other examples will be described later.

In the above-described embodiment, the liquid crystal display device which includes a liquid crystal display panel as a display panel is exemplified, although the display panel that is used in the display device of the embodiment of the present invention is not limited to this example. As the display panel, a display panel for PDP, an organic EL display panel, and an electrophoretic display panel, or the like, may be used. In the above-described example, the shape of the liquid crystal display panel is rectangular, although the present embodiment is also applicable to a display panel which has a different shape.

In the above-described liquid crystal display device 100A, the frame portions at two out of the four sides extending in the first direction D1 are visually obscured. Alternatively, other frame portions may be visually obscured. An example of a display device in which other frame portions are visually obscured will be described later.

Now, the shape of the viewer-side surface 22a of the lens portion 22 is described. The viewer-side surface 22a of the lens portion 22 is a lens surface which is configured to refract light going out from the pixels arrayed in the peripheral display region 10D toward the viewer's side. For example, a line of intersection between the viewer-side surface 22a of the lens portion 22 and a plane which is perpendicular to the display surface 10a of the liquid crystal display panel 10 and which is perpendicular to the first direction D1 is a circular arc. Alternatively, the line of intersection between the viewer-side surface 22a and a plane which is perpendicular to the display surface 10a and which is perpendicular to the first direction D1 may be a curve which is not a circular arc. Particularly, it is preferably a curve which is defined by an aspherical function described in WO 2009/157150. The entire disclosure of WO 2009/157150 is incorporated by reference in this specification.

For example, the shape of the viewer-side surface 22a of the lens portion 22 can be obtained as described below which is configured such that an image that has been formed in the peripheral display region 10D at an image compression rate a relative to an image formed in the central display region 10B is enlarged by 1/a times so as to be displayed over the viewer-side surface 22a of the lens portion 22.

The aspherical function $f(x)$ used herein is as follows:

$$f(x) = h - cx^2/(1 + (1 - (1+k)c^2x^2)^{1/2}) + A_4 x^4 + A_6 x^6 + A_8 x^8 + A_{10} x^{10}$$

where
  c: curvature of the lens portion 22 (an inverse of the radius of curvature),
  h: thickness of the flat portion 24, and
  k: conic constant.
x represents the position of each point on the viewer-side surface 22a of the lens portion 22 along the second direction D2. Zero (0) is set on the central display region 10B side. The value increases as the position becomes closer to the frame region 10F.

Assuming that, for example:
  width L1 of the peripheral display region 10D: 12 mm;
  width L2 of the frame region 10F: 3 mm;
  image compression rate a: 0.8
  thickness h of the flat portion 24: 13 mm;
  radius of curvature (an inverse of the curvature c of the lens portion 22, i.e., 1/c): 23 mm; and
  refractive index n of the lens portion 22: 1.49 (acrylic resin), the coefficients of the function have the following values.
  k=1.15
  $A_4 = -7.86 \times 10^{-7}$
  $A_6 = 1.89 \times 10^{-8}$
  $A_8 = -1.62 \times 10^{-10}$
  $A_{10} = 4.95 \times 10^{-13}$ The value of k is expressed by the following formula when a=0.4 to 0.89:

$$k = 89.918 a^4 - 194.57 a^3 + 159.82 a^2 - 57.099 a + 7.1865$$

When the image compression rate is small (e.g., a<0.7), the value of 1/a is large, so that each pixel is greatly enlarged. This can make the black matrix between adjacent pixels conspicuous, resulting in undesirable display in many cases. On the other hand, a large image compression rate (e.g., a>0.9) is not so preferred because a large lens portion is necessary as compared with the width of the frame region. For example, when the image compression rate a is 0.95, a=L1/(L1+L2)=0.95. Thus, the width of the lens portion, L1+L2, is 20 times the width L2 of the frame region. If the width L2 of the frame region is 3 mm as in the above example, the width of the lens portion, L1+L2, is 60 mm. For example, many of the display devices for use in mobile phones have the device width of not more than 60 mm, and therefore, a lens element whose lens portion width L1+L2 is 60 mm cannot be placed. Therefore, the image compression rate a is preferably about 0.7 to 0.9. Based on the above formula, the values of conic constant k for the image compression rate a=0.7, 0.9 are calculated to be k≈0.38, 2.4, respectively. Thus, the preferred range of conic constant k is not less than 0.38 and not more than 2.4.

The above aspherical function $f(x)$ is obtained using the above value of k, and the lens portion 22 which has the viewer-side surface 22a represented by $f(x)$ is manufactured, whereby an undistorted image can be displayed in the peripheral display region 10D and the frame region 10F.

The surface shape of the lens portion 22 is not limited to the above-described curved surface but may be, for example, a Fresnel lens shape.

As described above, in a display device which includes a sole display panel, the frame region and part of the housing which is provided outside the frame region (lateral housing portions) are observed. However, when part of light going out from a peripheral display region is allowed to go out on the viewer's side of the lateral housing portions, part of the image is displayed on the viewer's side of the lateral housing portions. When light entering the lateral housing portions on their rear side is allowed to go out on the viewer's side of the lateral housing portions, the rear environment behind the lateral housing portions is visible to the viewer therethrough. As a result, the lateral housing portions are visually obscured. Therefore, the frame can be visually obscured.

A display device in which the light-transmitting cover and the housing are separate components, such as the liquid crystal display device of the present embodiment, is suitably applicable to indoor stationary products, such as TV sets, monitors, digital photo frames, etc.

Next, a liquid crystal display device which is another embodiment of the present invention (the liquid crystal display device 100B shown in FIG. 4) is described with reference to FIG. 4 to FIG. 6.

Figure 4:
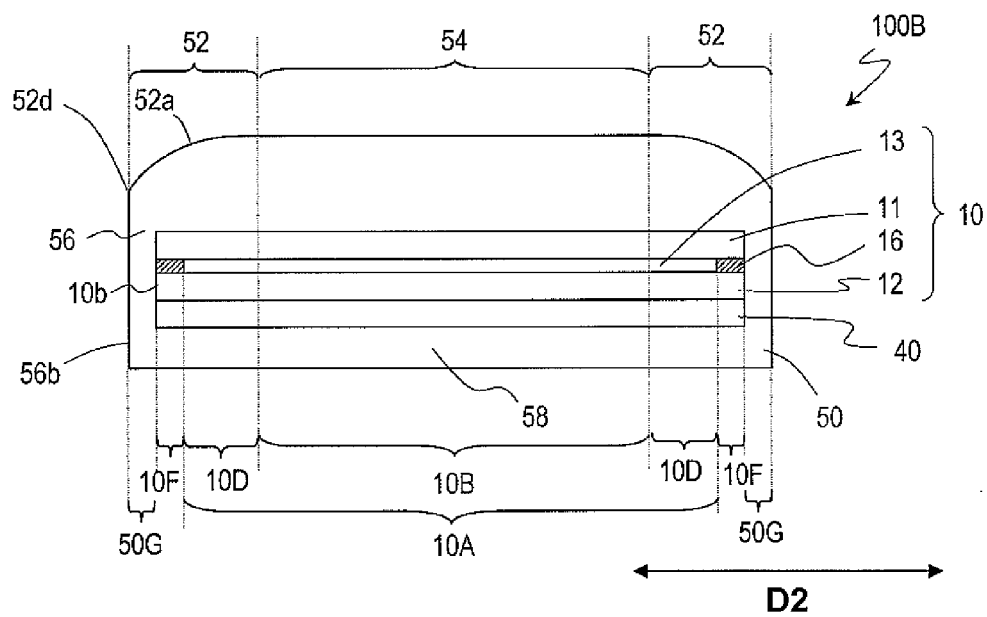
FIG. 4 A schematic cross-sectional view of a display device 100B of an embodiment of the present invention.

The liquid crystal display device 100B shown in FIG. 4 is different from the liquid crystal display device 100A (FIG. 1) in that part of an image formed in the display region is displayed on the viewer's side of the lateral housing portions such that the lateral housing portions are visually obscured. The liquid crystal display device 100B is also different from the liquid crystal display device 100A in that the lens portions are positioned so as to overlap regions which are constituted of the peripheral display regions 10D, the frame regions 10F and panel vicinity portions 50G (described later). The liquid crystal display device 100B shown in FIG. 4 includes a lens-integrated housing 50 (described later) instead of the light-transmitting cover and the housing. The liquid crystal display device 100B shown in FIG. 4 also includes a liquid crystal display panel 10 and a backlight device 40, which are the same as the liquid crystal display panel 10 and the backlight device 40 of the liquid crystal display device 100A. Hereinafter, the liquid crystal display device 100B is specifically described. For the sake of simplicity, in FIG. 4 to FIG. 6, the same components as those of the liquid crystal display device 100A shown in FIG. 1 to FIG. 3 are designated by the same reference numerals, and the descriptions thereof are herein omitted.

FIG. 4 is a schematic cross-sectional view of the liquid crystal display device 100B. The liquid crystal display device 100B includes the sole liquid crystal display panel 10, the backlight device 40, and the lens-integrated housing 50.

As shown in FIG. 4, the lens-integrated housing 50 is a single element into which the housing and the light-transmitting cover are integrated. The lens-integrated housing 50 includes lateral housing portions 56, a bottom housing portion 58, lens portions 52, and a flat portion 54. The lateral housing portions 56 are provided on side surfaces 10b of the liquid crystal display panel 10. The bottom housing portion 58 is provided under the backlight device 40. The lens portions 52 are positioned so as to overlap regions which includes the frame regions 10F and the peripheral display regions 10D of the liquid crystal display panel 10 and the panel vicinity portions 50G. The panel vicinity portions 50G refer to parts of the lateral housing portions 56 in which the lens portions 52 are provided at the viewer's side. As shown in FIG. 4, the lens portions 52 are positioned such that outer edges 52d of the lens portions 52 are present on the viewer's side of the outer end surfaces (or "side surfaces") 56b of the lateral housing portions 56. Therefore, in the liquid crystal display device 100B, the lens portions 52 extend over the entire viewer's side of the lateral housing portions 56, and therefore, the panel vicinity portions 50G correspond to regions in which the lateral housing portions 56 are provided.

The liquid crystal display device 100B refracts light going out from the peripheral display regions 10D by means of the lens portions 52 such that images formed in the peripheral display regions 10D are enlarged so as to be displayed over regions constituted of the peripheral display regions 10D, the frame regions 10F, and the panel vicinity portions 50G. As described above, the lens portions 52 are provided in regions which cover the entire viewer's side of the lateral housing portions 56, and therefore, part of the images are displayed on the viewer's side of the lateral housing portions 56 by the lens portions 52. Thus, since parts of the images are displayed on the viewer's side of the frame regions 10F and the lateral housing portions 56, a display device in which the frame is visually obscured is realized.

Hereinafter, why the frame of the liquid crystal display device 100B is visually obscured is described in more detail with reference to FIG. 5 and FIG. 6. FIG. 5 is an enlarged cross-sectional view schematically showing part of the liquid crystal display device 100B near an edge portion. FIG. 6 is a diagram schematically showing the liquid crystal display device 100B, which is seen from the viewer's side.

Figure 5:
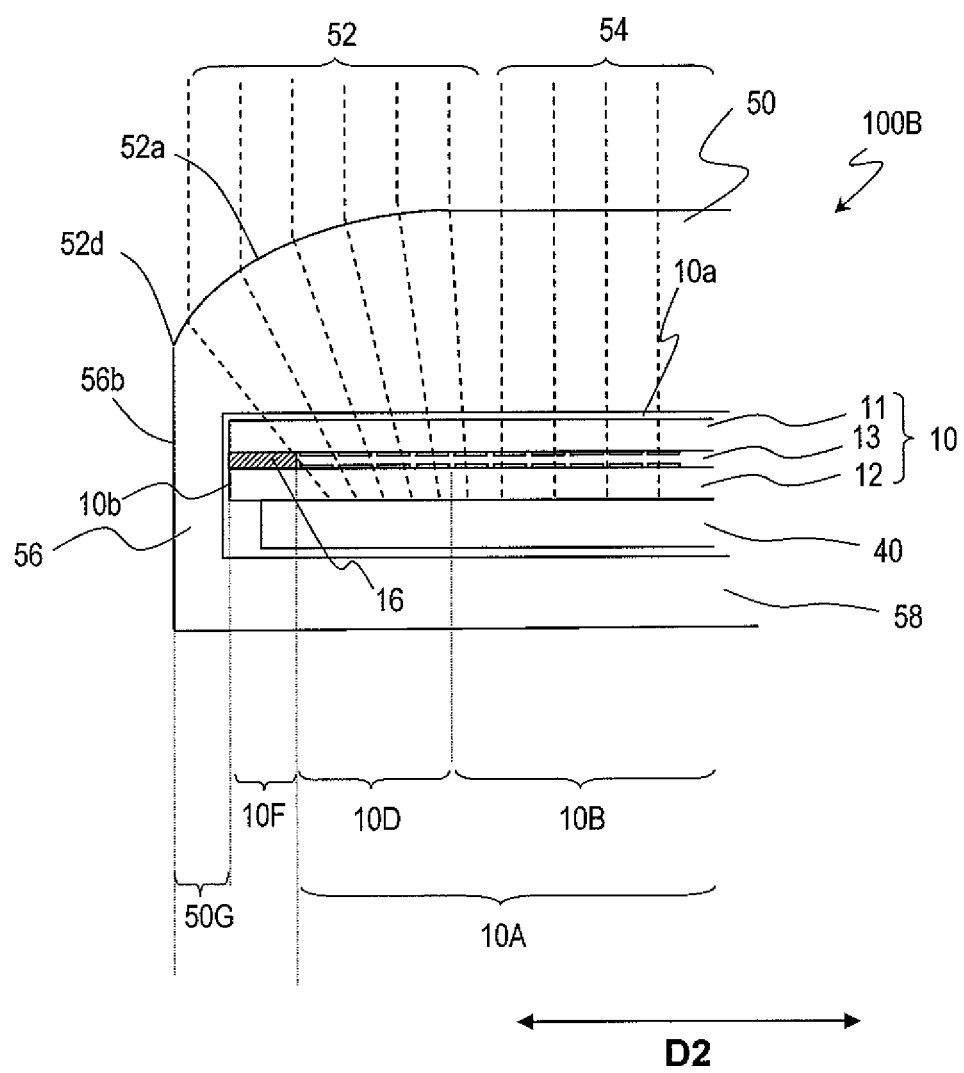
FIG. 5 An enlarged cross-sectional view schematically showing part of the liquid crystal display device 100B near an edge portion.

As shown in FIG. 5, the lens portion 52 of the lens-integrated housing 50 is provided in a region which includes the peripheral display region 10D and the frame region 10F of the liquid crystal display panel 10 and the panel vicinity portion 50G, and the viewer-side surface 52a of the lens portion 52 is a curved surface. The flat portion 54 is positioned so as to overlap the central display region 10B of the liquid crystal display panel 10. The viewer-side surface of the flat portion 54 is parallel to the display surface 10a. The lateral housing portions 56 are provided outside the side surfaces 10b at two out of the four sides of the rectangular liquid crystal display panel 10 extending in the first direction D1. The lens portions 52 are positioned so as to overlap regions at the two sides extending in the first direction D1, each of the regions including the peripheral display region 10D, the frame region 10F and the panel vicinity portion 50G.

In FIG. 5, broken lines represent light rays which go out from the pixels arrayed in the display region 10A to enter the lens portions 52 and the flat portion 54. Light rays going out from the peripheral display region 10D enter the lens portion 52 and are refracted outwardly (toward the frame region 10F side). Here, the light rays entering the lens portion 52 are refracted at the viewer-side surface 52a of the lens portion 52 and go out from the viewer-side surface 52a of the lens portion 52 provided over the peripheral display region 10D, the frame region 10F, and the panel vicinity portion 50G. The light rays going out from the viewer-side surface 52a of the lens portion 52 travel straight in a direction perpendicular to the display surface 10a. Therefore, an image formed in the peripheral display region 10D of the liquid crystal display panel 10 is enlarged so as to be displayed in a region constituted of the peripheral display region 10D, the frame region 10F, and the panel vicinity portion 50G. Meanwhile, light rays going out from the pixels arrayed in the central display region 10B enter the flat portion 54 and travel straight in a direction perpendicular to the display surface 10a (FIG. 5). Therefore, on the viewer's side of the flat portion 54, an image formed in the central display region 10B is displayed.

Since, as shown in FIG. 5, in the liquid crystal display device 100B, the panel vicinity portion 50G corresponds to a region in which the lateral housing portion 56 are provided, the situation that part of an image is displayed on the panel vicinity portion 50G means that the lateral housing portion 56 is visually obscured. Therefore, the frame of the liquid crystal display device 100B (the frame region 10F and the lateral housing portions 56) is visually obscured.

Since the lens portions 52 are provided over the peripheral display regions 10D, the frame regions 10F, and the panel vicinity portions 50G at the two sides extending in the first direction D1, part of the image is displayed over the frame regions 10F and the panel vicinity portions 50G at the two sides extending in the first direction D1. Therefore, the frame portions of the liquid crystal display device 100B at the two sides extending in the first direction D1 are visually obscured.

Figure 6:
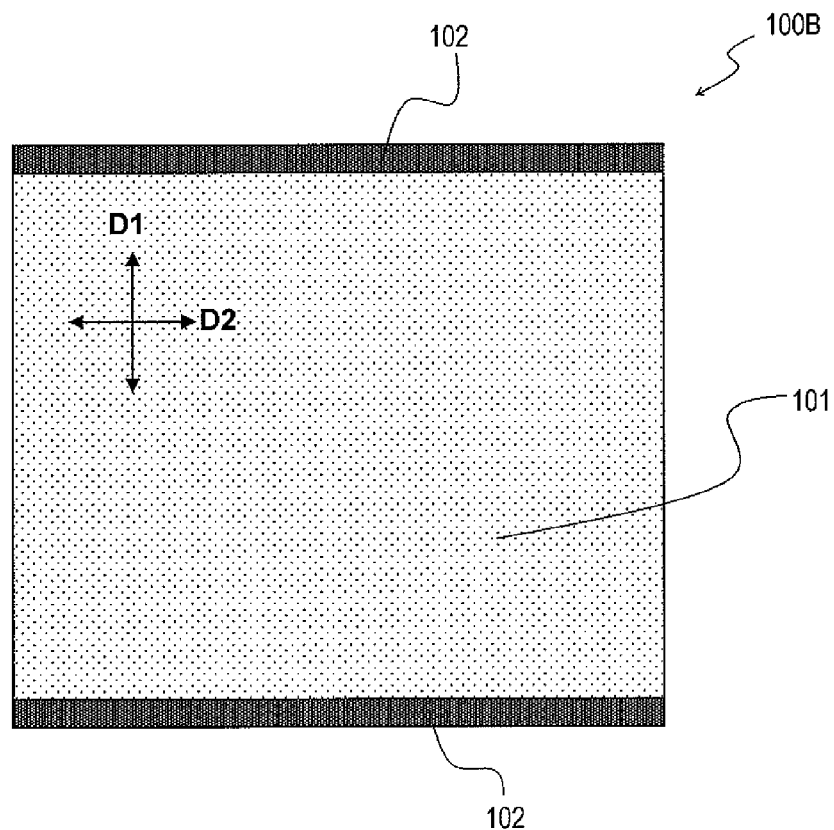
FIG. 6 A diagram schematically showing the liquid crystal display device 100B, which is seen from the viewer's side.

As shown in FIG. 6, when the liquid crystal display device 100B is viewed from the viewer's side, the frame portions at the two sides extending in the second direction D2 are visually recognized (the regions 102 in which the frame is visually recognized). On the other hand, the frame portions at the two sides extending in the first direction D1 are included in a region 101 in which an image is to be displayed. Thus, in the liquid crystal display device 100B, the frame portions at the two sides extending in the first direction D1 are visually obscured.

Since the liquid crystal display device 100B (see FIG. 4 to FIG. 6) includes the lens-integrated housing 50 instead of the light-transmitting cover and the housing, entry of dust and dirt is advantageously prevented. Note that the liquid crystal display device 100B may include the light-transmitting cover and the housing instead of the lens-integrated housing 50. Even in such a case, the frame is visually obscured so long as the lens portion of the light-transmitting cover has the above-described configuration. Specifically, the lens portion of the light-transmitting cover is provided in a region which includes the frame region of the liquid crystal display panel and the entire viewer's side of the lateral housing portions, whereby part of an image is displayed in the region that includes the frame region and the entire viewer's side of the lateral housing portions, so that the frame (the frame region and the lateral housing portions) is visually obscured.

Next, an liquid crystal display device which is still another embodiment of the present invention is described with reference to FIG. 7 to FIG. 9.

Figure 7:
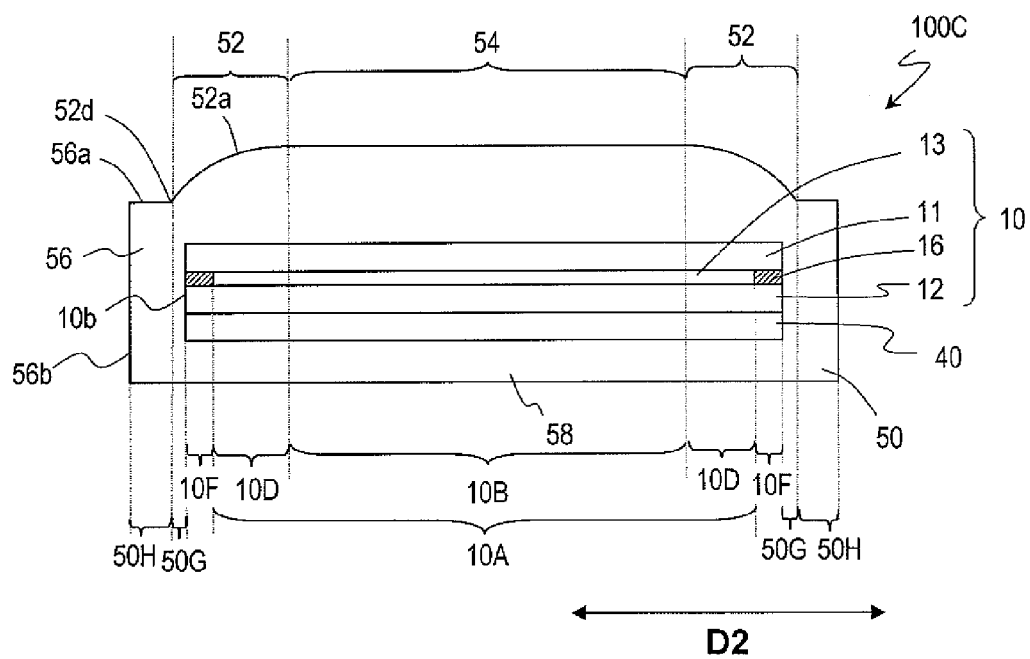
FIG. 7 A schematic cross-sectional view of a display device 100C of an embodiment of the present invention.

In the liquid crystal display device 100C shown in FIG. 7, a region in which part of an image is displayed and a region in which the rear environment is visible therethrough are present on the viewer's side of the lateral housing portions, whereby the frame is visually obscured. Hereinafter, for the sake of simplicity, the same components as those shown in FIG. 1 to FIG. 6 are designated by the same reference numerals, and the descriptions thereof are herein omitted.

FIG. 7 is a schematic cross-sectional view of the liquid crystal display device 100C. The liquid crystal display device 100C includes the sole liquid crystal display panel 10, the backlight device 40, and the lens-integrated housing 50.

The lens-integrated housing 50 is capable of transmitting light and includes the lateral housing portions 56, the bottom housing portion 58, the lens portions 52, and the flat portion 54. The lateral housing portions 56 are provided on the side surfaces 10b of the liquid crystal display panel 10. The lens portions 52 are positioned so as to overlap regions which include the frame regions 10F and the peripheral display regions 10D of the liquid crystal display panel 10 and the panel vicinity portions 50G. Light going out from the peripheral display regions 10D are outwardly refracted by the lens portions 52. Therefore, images formed in the peripheral display regions 10D are enlarged so as to be displayed over regions constituted of the peripheral display regions 10D, the frame regions 10F, and the panel vicinity portions 50G.

As shown in FIG. 7, the side surfaces 56b of the lateral housing portions 56 are at outer positions relative to outer edges 52d of the lens portions 52. Therefore, on the viewer's side of the lateral housing portions 56, regions in which the lens portions 52 are not provided are present in parts of the lateral housing portions 56 which are exclusive of the panel vicinity portions 50G (parts of the lateral housing portions 56 in which the lens portions 52 are provided on the viewer's side). Hereinafter, the parts of the lateral housing portions 56 in which the lens portions 52 are not provided on the viewer's side are referred to as "outer portions 50H". The outer portions 50H are capable of transmitting light, so that part of light entering the outer portions 50H on their rear side go out on the viewer's side of the outer portions 50H. Therefore, on the outer portions 50H, the rear environment behind the outer portions 50H is visible to the viewer therethrough.

Since there are regions in which part of an image is displayed (the panel vicinity portions 50G) and regions in which the rear environment is visible therethrough on the viewer's side of the lateral housing portions 56 (the outer portions 50H), the lateral housing portions 56 are visually obscured. Therefore, a display device is realized in which the frame (the frame regions 10F and the lateral housing portions 56 of the liquid crystal display panel 10) is visually obscured.

Hereinafter, why the frame of the liquid crystal display device 100C is visually obscured is described in more detail with reference to FIG. 8 and FIG. 9. FIG. 8 is an enlarged cross-sectional view schematically showing part of the liquid crystal display device 100C near an edge portion. FIG. 9 is a diagram schematically showing the liquid crystal display device 100C, which is seen from the viewer's side.

Figure 8:
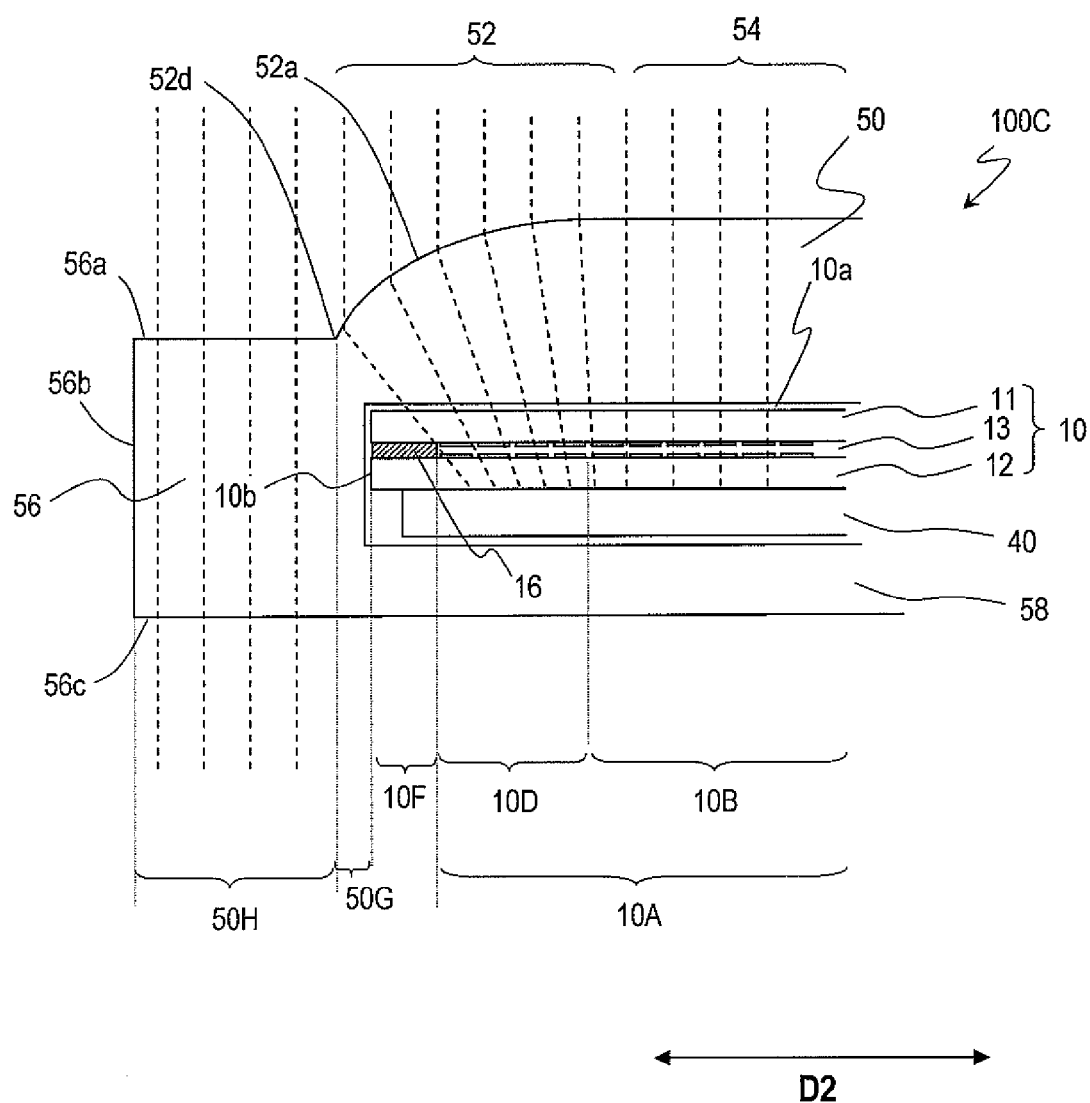
FIG. 8 An enlarged cross-sectional view schematically showing part of the liquid crystal display device 100C near an edge portion.

As shown in FIG. 8, light going out from the peripheral display region 10D is outwardly refracted at the viewer-side surface 52a of the lens portion 52 and goes out from the viewer-side surface 52a of the lens portion 52 which is provided over the peripheral display region 10D, the frame region 10F, and the panel vicinity portion 50G. Therefore, an image formed in the peripheral display region 10D is enlarged so as to be displayed over a region constituted of the peripheral display region 10D, the frame region 10F, and the panel vicinity portion 50G. The viewer-side surface 56a and the rear-side surface 56c of the lateral housing portions 56 are parallel to the display surface 10a. Light entering the outer portion 50H of the lateral housing portion 56 on its rear side travels straight through the outer portion 50H in a direction perpendicular to the display surface 10a and goes out toward the viewer's side. Thus, on the outer portion 50H, the rear environment behind the outer portion 50H is visible therethrough.

In the lateral housing portion 56, part of an image formed in the peripheral display region 10D is displayed on the panel vicinity portion 50G, while in the outer portion 50H, the rear environment is visible therethrough. Therefore, the lateral housing portion 56 is visually obscured. On the viewer's side of the frame region 10F of the liquid crystal display panel 10, part of an image formed in the peripheral display region 10D is displayed, so that the frame region 10F is visually obscured. Therefore, the frame of the liquid crystal display device 100C (the frame region 10F and the lateral housing portions 56) is visually obscured. The lens portions 52 and the lateral housing portions 56 are provided at the two sides of the liquid crystal display device 100C extending in the first direction D1. In the liquid crystal display device 100C, the frame portions at the two sides extending in the first direction D1 are visually obscured.

Figure 9:
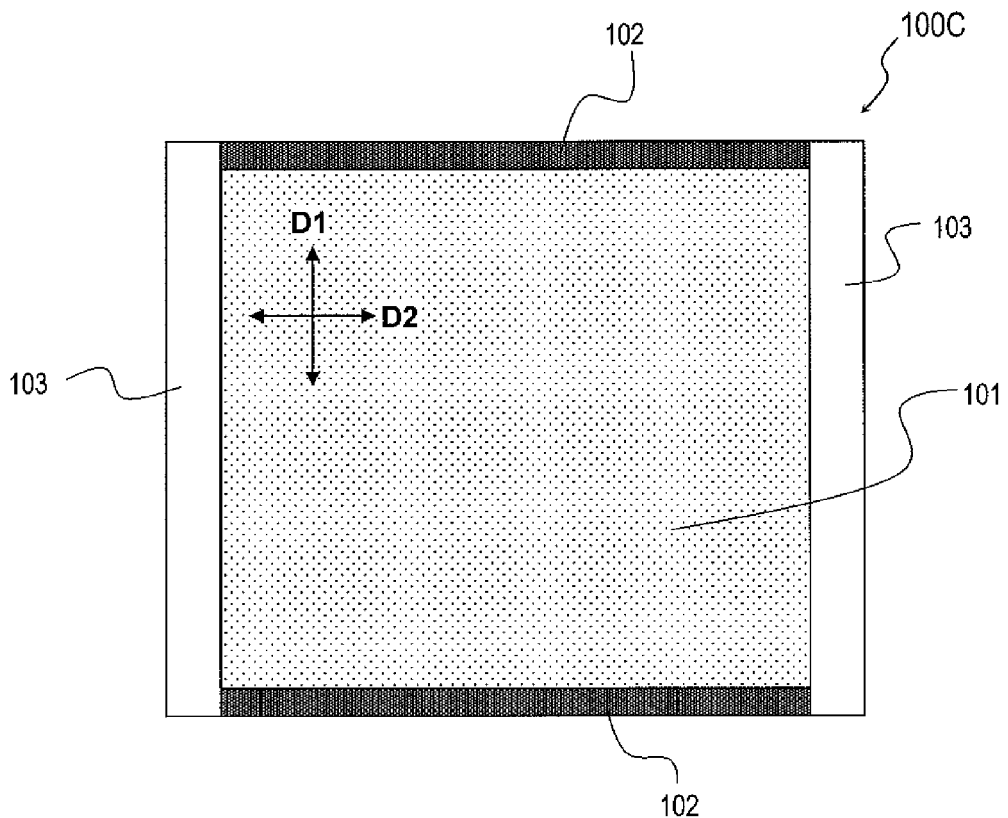
FIG. 9 A diagram schematically showing the liquid crystal display device 100C, which is seen from the viewer's side.

As shown in FIG. 9, when the liquid crystal display device 100C is viewed from the viewer's side, the frame portions at the two sides extending in the second direction D2 are visually recognized (the regions 102 in which the frame is visually recognized). On the other hand, on the frame portions at the two sides extending in the first direction D1, the rear environment is visible therethrough (the regions 103 in which the rear environment is visible therethrough). Thus, in the liquid crystal display device 100C, the frame portions at the two sides extending in the first direction D1 are visually obscured.

In the liquid crystal display device 100C, regions in which the rear environment is visible therethrough are present on the viewer's side of the lateral housing portions 56 as described above. Therefore, the region in which an image is to be displayed (i.e., the panel vicinity portions 50G) can be decreased as compared to a display device which is configured to display an image over the entire lateral housing portions (the liquid crystal display device 100B), Therefore, the liquid crystal display device 100C can have smaller lens portions than the liquid crystal display device 100B does. As compared to the liquid crystal display device 100B in which the lens portion is positioned over a region that includes the entire viewer's side of lateral housing portion. Because, in the liquid crystal display device 100C, the lens portion is provided only in part of the lateral housing portion which is in the vicinity of the panel at the viewer's side.

To improve the shock resistance of the liquid crystal display device 100C, the width of the lateral housing portions 56 (the width of the second direction D2 in FIG. 7 and FIG. 8) may be increased. In the liquid crystal display device 100C, when the width of the lateral housing portions 56 is increased, it is not necessary to change the size of the panel vicinity portions. Therefore, the shock resistance can be improved without changing the size of the lens portions. On the other hand, in the liquid crystal display device 100B, when the width of the lateral housing portions is increased, the panel vicinity portions are also increased. The increased panel vicinity portions lead to increased lens portions, and accordingly, the weight and manufacture cost of the housing 50 disadvantageously increase. The liquid crystal display device 100C has an advantage over the liquid crystal display device 100B, such that a thin, light-weight display device which has high shock resistance can be realized at low cost.

Since the liquid crystal display device 100C includes portions on which an image is to be displayed in part of the lateral housing portions (panel vicinity portions), the liquid crystal display device 100C is advantageous in that, when the display device is viewed in an oblique viewing direction, the side surfaces of the display panel are visually obscured, as compared to a case where an image is displayed only in a peripheral display region. Note that the visual obscurity of the side surfaces of the display panel increases as the panel vicinity portions become larger.

As for the lateral housing portions 56 of the lens-integrated housing 50 of the liquid crystal display device 100C, the viewer-side surface 56a and the rear-side surface 56c are parallel to the display surface 10a, although the shape of the lateral housing portions 56 is not limited to this example. For example, at least one of the viewer-side surface 56a and the rear-side surface 56c of the lateral housing portions 56 may be a lens surface. A display device example where at least one of the viewer-side surface 56a and the rear-side surface 56c of the lateral housing portions 56 is a lens surface is described with reference to FIG. 10 to FIG. 13. FIG. 10 to FIG. 13 are enlarged schematic cross-sectional views of the display device where at least one of the viewer-side surface 56a and the rear-side surface 56c of the lateral housing portions 56 is a lens surface, showing part of the device near an edge portion.

Figure 10:
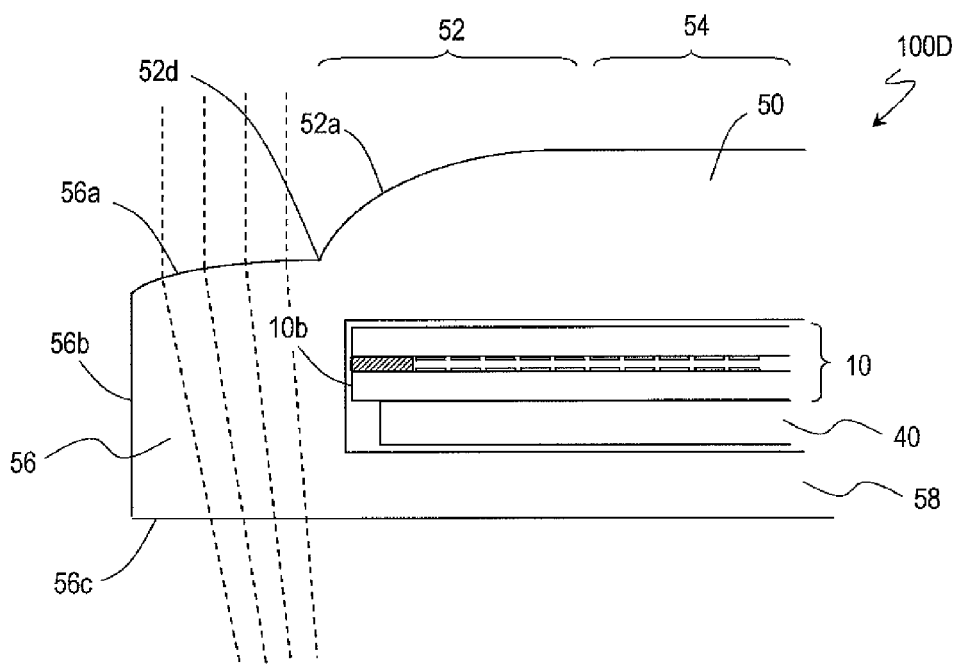
FIG. 10 An enlarged cross-sectional view schematically showing part of the liquid crystal display device 100D near an edge portion.

FIG. 10 is a schematic enlarged cross-sectional view of an edge portion of a liquid crystal display device 100D where the viewer-side surface 56a of the lateral housing portion 56 is a curved surface. The viewer-side surface 56a of the lateral housing portion of the liquid crystal display device 100D is a curved surface which is configured such that the distance between the curved surface and the rear-side surface 56c decreases along the direction from the center to the perimeter of the display device (from right to left in the sheet of FIG. 10). With this configuration, as illustrated in FIG. 10, light rays entering the rear-side surface 56c are outwardly refracted and go out from the viewer-side surface 56a. The light rays going out from the viewer-side surface 56a to the viewer (light rays traveling in a direction normal to the display surface 10a) are, as illustrated in FIG. 10, derived from light rays which have entered the lateral housing portion 56 at positions that are closer to the display panel than the positions on the viewer-side surface 56a from which the light rays go out. Therefore, part of the rear environment behind the display panel, rather than behind the lateral housing portion 56, is visible through the lateral housing portion 56 to the viewer.

Figure 11:
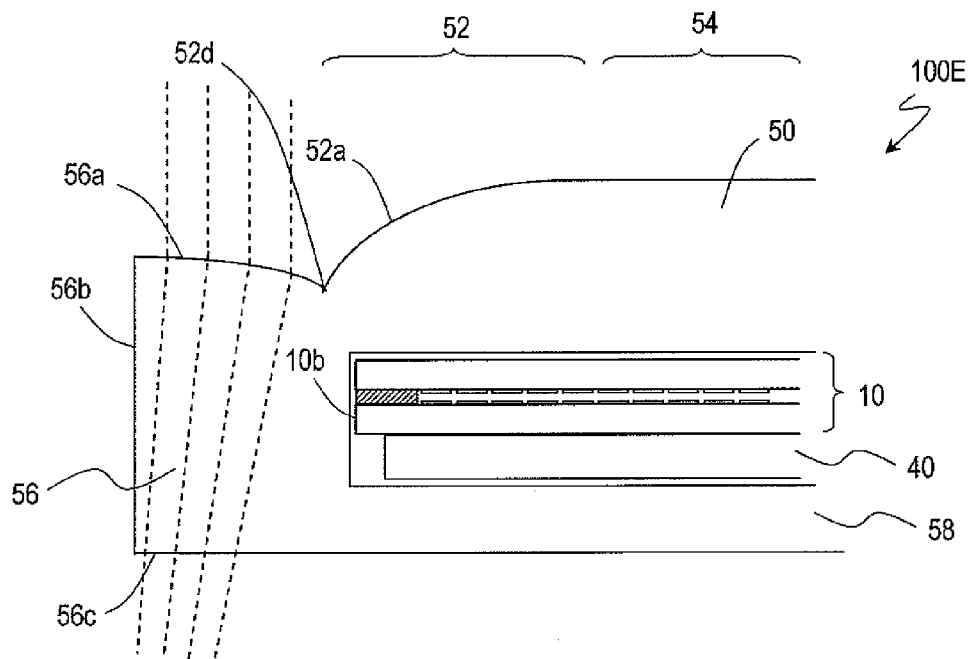
FIG. 11 An enlarged cross-sectional view schematically showing part of the liquid crystal display device 100E near an edge portion.

Alternatively, as in a liquid crystal display device 100E shown in FIG. 11, the viewer-side surface 56a of the lateral housing portion 56 may be a curved surface which is configured such that the distance between the curved surface and the rear-side surface 56c increases along the direction from the center to the perimeter of the display device (from right to left in the sheet of FIG. 11). With this configuration, as illustrated in FIG. 11, light rays entering the rear-side surface 56c are inwardly refracted and go out from the viewer-side surface 56a. The light rays going out from the viewer-side surface 56a to the viewer are, as illustrated in FIG. 11, derived from light rays which have entered the lateral housing portion 56 at outer positions relative to the positions on the viewer-side surface 56a from which the light rays go out. Therefore, the rear environment behind an outer position relative to the lateral housing portion 56 is visible through the lateral housing portion 56 to the viewer. In the liquid crystal display device 100E, the side surface 10b of the liquid crystal display panel 10 is visually obscured as compared to the liquid crystal display device 100D (FIG. 10).

Figure 12:
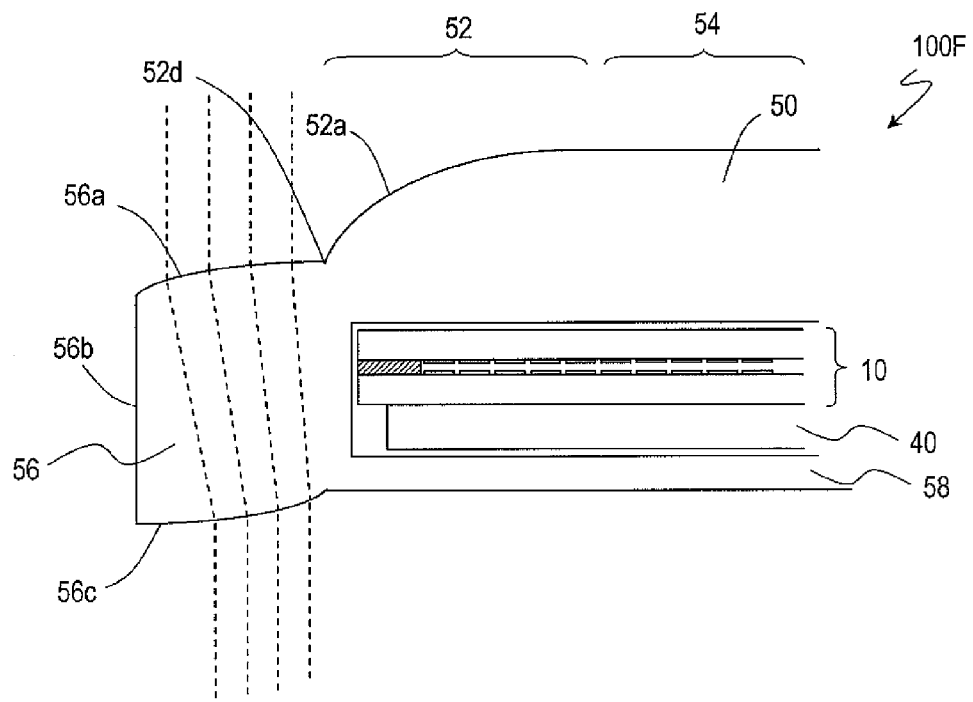
FIG. 12 An enlarged cross-sectional view schematically showing part of the liquid crystal display device 100F near an edge portion.

A liquid crystal display device 100F shown in FIG. 12 is different from the liquid crystal display device 100D (see FIG. 10) in that the rear-side surface 56c of the lateral housing portion 56 is a curved surface. As shown in FIG. 12, light rays entering the lateral housing portion 56 are refracted twice, at the rear-side surface 56c and the viewer-side surface 56a. The light rays entering the lateral housing portion 56 are outwardly refracted at the rear-side surface 56c and then inwardly refracted at the viewer-side surface 56a. Since the refraction by the viewer-side surface 56a and the refraction by the rear-side surface 56c occur in opposite directions, as illustrated in FIG. 12, light rays impinging on the rear-side surface 56c from a direction normal to the display surface of the display panel are refracted twice and go out from the viewer-side surface 56a to the viewer. Therefore, the rear environment behind the lateral housing portion 56 is visible to the viewer therethrough. In the case of the liquid crystal display device 100D, part of the rear environment behind the display panel, rather than behind the lateral housing portion 56, may sometimes be visible through the lateral housing portion 56 as described above. Thus, the liquid crystal display device 100D may sometimes provide a sense of discontinuity between part of the rear environment which can be seen outside the liquid crystal display device 100D and another part of the rear environment which is visible through the lateral housing portion 56. As compared to the liquid crystal display device 100D, the liquid crystal display device 100F advantageously prevents provision of a sense of discontinuity between part of the rear environment which can be seen outside the lateral housing portion 56 and another part of the rear environment which is visible through the lateral housing portion 56.

Figure 13:
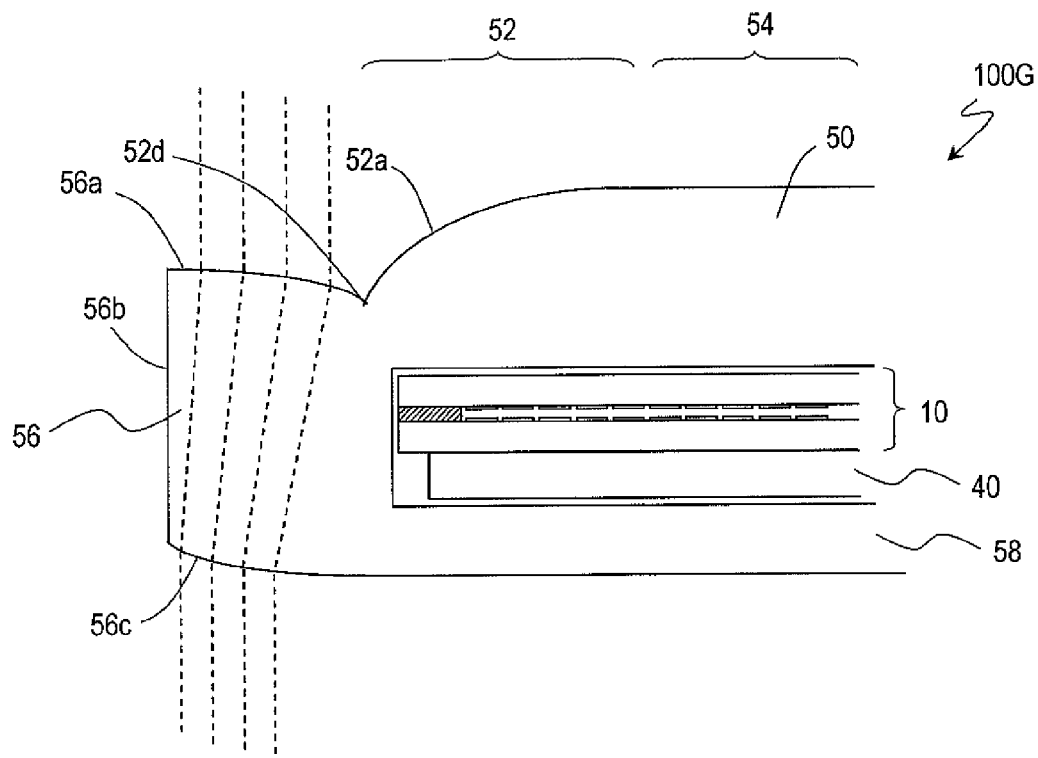
FIG. 13 An enlarged cross-sectional view schematically showing part of the liquid crystal display device 100G near an edge portion.

A liquid crystal display device 100G shown in FIG. 13 is different from the liquid crystal display device 100E (FIG. 11) in that the rear-side surface 56c of the lateral housing portions 56 is a curved surface. As in the liquid crystal display device 100F (FIG. 12), light rays entering the lateral housing portion 56 are refracted twice, at the rear-side surface 56c and the viewer-side surface 56a. The liquid crystal display device 100G also advantageously prevents provision of a sense of discontinuity between part of the rear environment which can be seen outside the liquid crystal display device 100G and another part of the rear environment which is visible through the lateral housing portion 56.

Next, a liquid crystal display device which is still another embodiment of the present invention is described with reference to FIG. 14 to FIG. 16.

Figure 14:
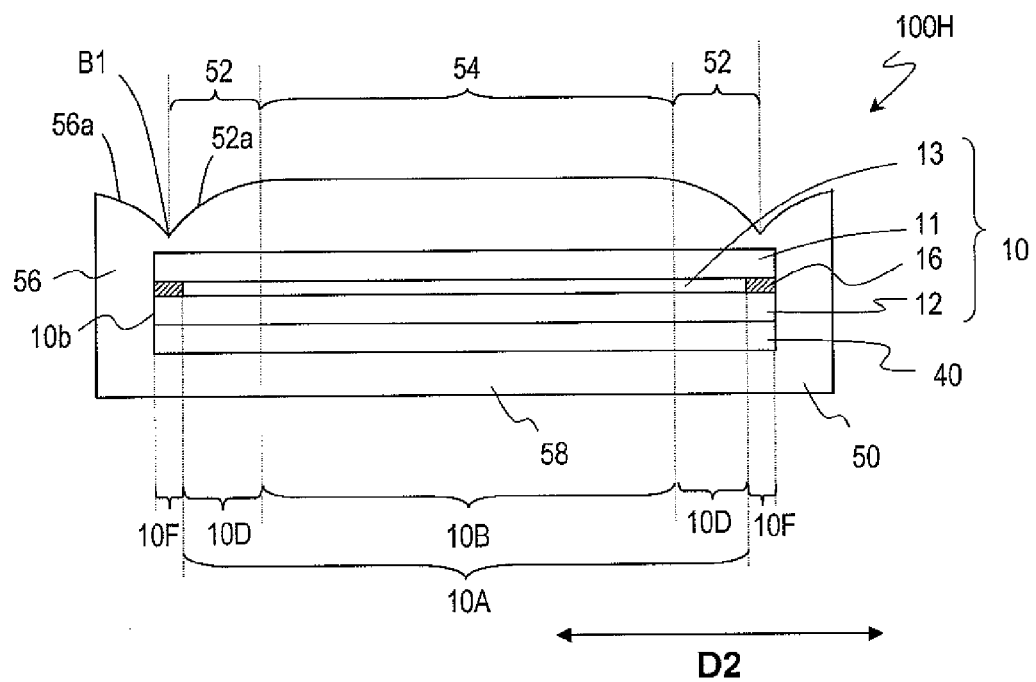
FIG. 14 A schematic cross-sectional view of a display device 100H of an embodiment of the present invention.

The liquid crystal display device 100H shown in FIG. 14 is configured such that the viewer-side surface 56a of the lateral housing portion 56 and the viewer-side surface 52a of the lens portion 52 form a boundary B1. An image is displayed inside the boundary B1, while the rear environment is visible therethrough outside the boundary B1, so that the frame is visually obscured.

FIG. 14 is a schematic cross-sectional view of the liquid crystal display device 100H. The liquid crystal display device 100H includes the sole liquid crystal display panel 10, the backlight device 40, and the lens-integrated housing 50.

The lateral housing portions 56 of the lens-integrated housing 50 are configured such that the viewer-side surface 56a of the lateral housing portions 56 and the viewer-side surface 52a of the lens portions 52 form a boundary B1. The lateral housing portions 56 are provided on the side surfaces 10b of the liquid crystal display panel 10 and in part of the frame regions 10F. As shown in FIG. 14, the boundary B1 is on the viewer's side of the frame regions 10F. Therefore, the lateral housing portions 56 are present at outer positions relative to the boundaries B1 in the frame regions 10F.

The lateral housing portions 56 are capable of transmitting light. The viewer-side surfaces 56a of the lateral housing portions are lens surfaces. Light rays entering the lateral housing portions 56 on the rear side of the lateral housing portions 56 are inwardly refracted and go out toward the viewer. Therefore, the rear environment behind the lateral housing portion 56 is visible to the viewer therethrough at an outer position relative to the boundary B1.

The lens portion 52 is provided inside the boundary B1 between the peripheral display region 10D and the frame region 10F. Light rays going out from the peripheral display region 10D are outwardly refracted by the lens portion 52, so that an image formed in the peripheral display region 10D is enlarged so as to be displayed over a region constituted of the peripheral display region 10D and part of the frame region 10F lying inside the boundary B1.

In the case of the liquid crystal display device 100H, in a region outside the boundary B1 (i.e., a region where the lateral housing portion 56 is provided), the rear environment is visible therethrough, while in a region inside the boundary B1, an image is displayed. Therefore, a display device in which the frame is visually obscured can be realized.

Hereinafter, why the frame of the liquid crystal display device 100H is visually obscured is described in more detail with reference to FIG. 15 and FIG. 16. FIG. 15 is an enlarged cross-sectional view schematically showing part of the liquid crystal display device 100H near an edge portion. FIG. 16 is a diagram schematically showing the liquid crystal display device 100H, which is seen from the viewer's side.

Figure 15:
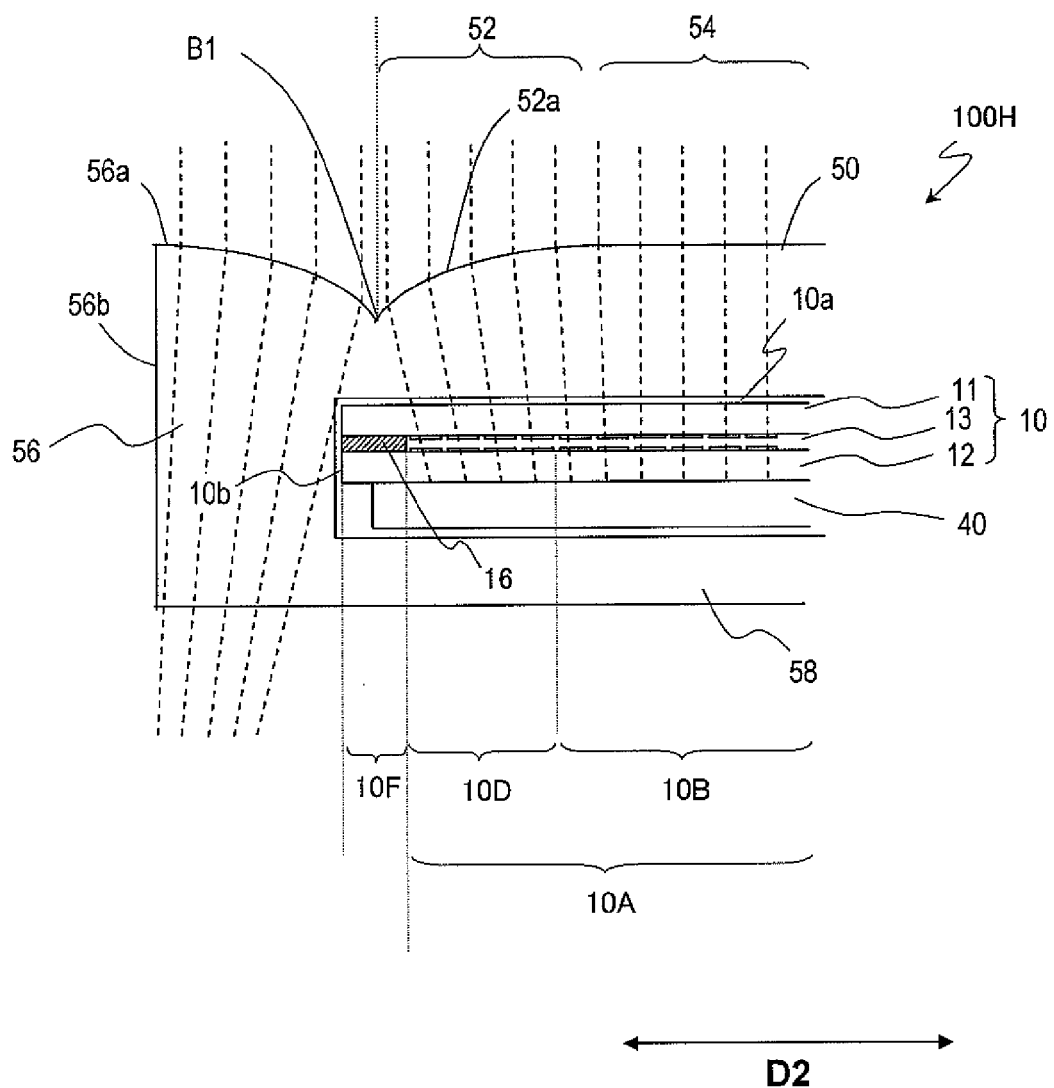
FIG. 15 An enlarged cross-sectional view schematically showing part of the liquid crystal display device 100H near an edge portion.

As shown in FIG. 15, light going out from the peripheral display region 10D is outwardly refracted at the viewer-side surface 52a of the lens portion 52 and goes out from the viewer-side surface 52a of the lens portion 52. Therefore, an image formed in the peripheral display region 10D is enlarged so as to be displayed over a region constituted of the peripheral display region 10D and part of the frame region 10F (part of the frame region 10F lying inside the boundary B1). The rear-side surface of the lateral housing portion 56 is parallel to the display surface 10a. The viewer-side surface 56a of the lateral housing portion 56 is a lens surface which is configured such that the distance between the viewer-side surface 56a and the rear-side surface 56c increases along the direction from the boundary B1 to the perimeter. Therefore, light rays entering the lateral housing portion 56 at the rear-side surface 56c are inwardly refracted at the viewer-side surface 56a and go out from the viewer's side of the lateral housing portion 56 (part of the lateral housing portion 56 lying outside the boundary B1). Light rays going out from the viewer-side surface 56a of the lateral housing portion 56 travel straight in a direction perpendicular to the display surface 10a. Therefore, the rear environment behind the lateral housing portion 56 is visible therethrough over a portion lying outside the boundary B1.

In part of the frame region 10F lying inside the boundary B1, part of an image is displayed, while in the part of the frame region 10F lying outside the boundary B1, the rear environment is visible therethrough, so that the frame region 10F is visually obscured. In part of the lateral housing portion 56 lying outside the side surface 10b of the liquid crystal display panel 10, the rear environment is visible therethrough. Therefore, in the liquid crystal display device 100H, the frame (the frame region 10F and the lateral housing portion 56) is visually obscured. In the liquid crystal display device 100H, the lens portions 52 and the lateral housing portions 56 are provided at the two sides of the liquid crystal display device 100H extending in the first direction D1. In the liquid crystal display device 100H, the frame at the two sides extending in the first direction D1 is visually obscured.

Figure 16:
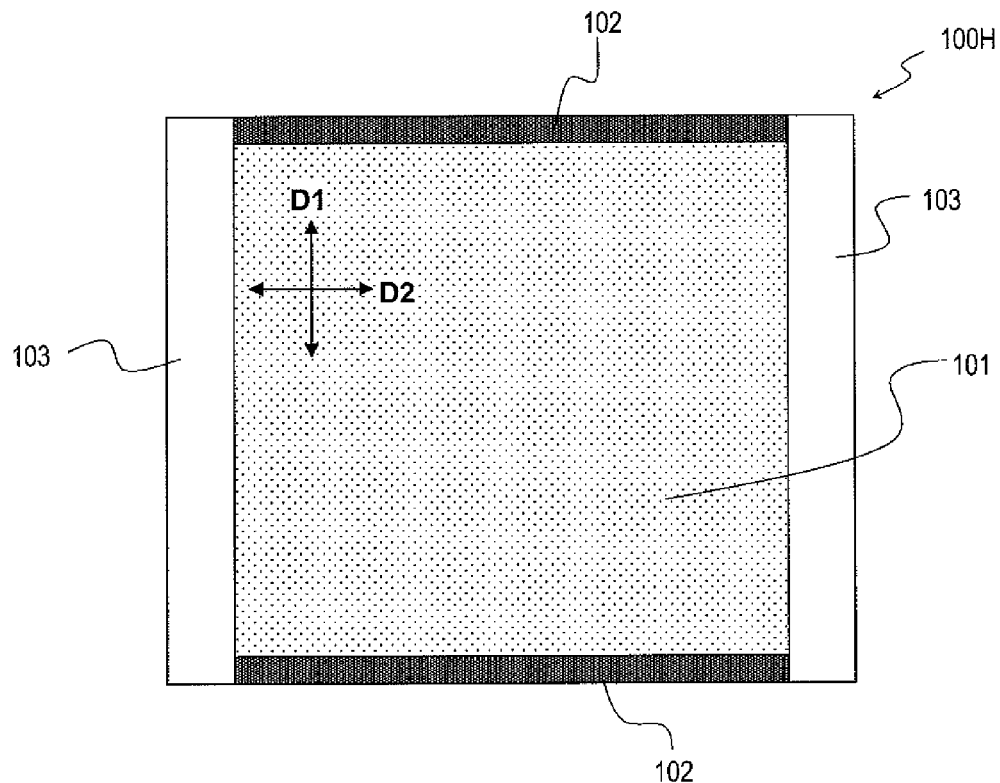
FIG. 16 A diagram schematically showing the liquid crystal display device 100H, which is seen from the viewer's side.

As shown in FIG. 16, when the liquid crystal display device 100H is viewed from the viewer's side, the frame portions at the two sides extending in the second direction D2 are visually recognized (the regions 102 in which the frame is visually recognized). On the other hand, on the frame portions at the two sides extending in the first direction D1, the rear environment is visible therethrough (the regions 103 in which the rear environment is visible therethrough). Thus, in the liquid crystal display device 100H, the frame portions at the two sides extending in the first direction D1 are visually obscured.

In the liquid crystal display device 100H, the frame region 10F includes a region where the rear environment is visible therethrough. Therefore, as compared to a display device which displays an image over the entirety of the frame region 10F, the region in which the image is to be displayed can be decreased. Thus, since the lens portions 52 can be decreased, the thickness and the weight of the display device can be reduced.

Next, the shape of the viewer-side surface 52a of the lens portion 52 is described. Hereinafter, the lens portion 52 of the lens-integrated housing 50 of the above-described embodiment is described as an example.

The viewer-side surface 52a of the lens portions 52 is a lens surface which is configured to refract light going out from the pixels arrayed in the peripheral display region 10D. For example, the viewer-side surface 52a of the lens portion 52 may be a curved surface which is configured such that a line of intersection between the viewer-side surface 52a and a plane which is perpendicular to the display surface 10a of the liquid crystal display panel 10 is a circular arc. The line of intersection between the viewer-side surface 52a and a plane which is perpendicular to the display surface 10a and which is perpendicular to the first direction D1 may be a circular arc. Alternatively, the line of intersection between the viewer-side surface 52a and a flat surface which is perpendicular to the display surface 10a and which is perpendicular to the first direction D1 may be a curve which is not a circular arc. Particularly, it is preferably a curve defined by an aspherical function described in WO 2009/157150 which has been mentioned above.

For example, by designing the lens portion 52 such that the line of intersection between the viewer-side surface 52a and a plane which is perpendicular to the display surface 10a and which is perpendicular to the first direction D1 meets the above-described aspherical function, an image that has been formed in the peripheral display region 10D at the image compression rate a relative to an image formed in the central display region 10B is enlarged by 1/a times so as to be displayed over the viewer-side surface 52a of the lens portion 52. Accordingly, an undistorted image can be displayed in a region constituted of the peripheral display region 10D, the frame region 10F, and the panel vicinity portion 50G.

Figure 17:
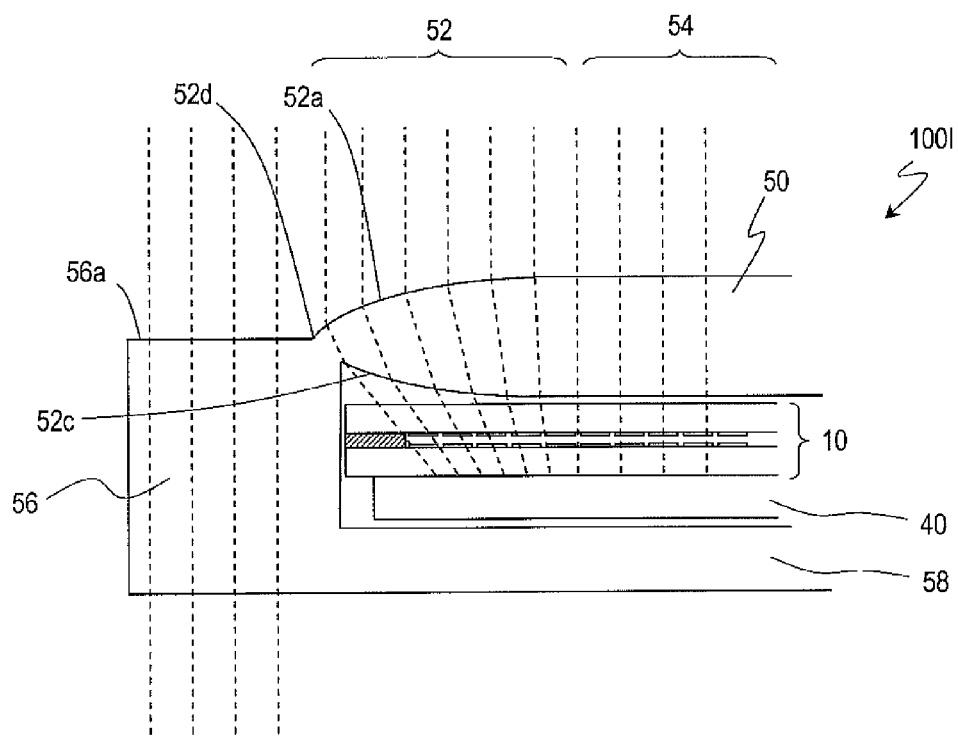
FIG. 17 An enlarged cross-sectional view schematically showing part of the liquid crystal display device 100I near an edge portion.

In the lens portion 52 of the above-described embodiments, only the viewer-side surface 52a is a curved surface, although the lens portion 52 may be configured such that both the viewer-side surface 52a and the rear-side surface may be curved surfaces. FIG. 17 shows a liquid crystal display device 100I in which the viewer-side surface 52a and the rear-side surface 52c of the lens portion are curved surfaces. The liquid crystal display device 100I shown in FIG. 17 is different from the liquid crystal display device 100C (see FIG. 8) in that the viewer-side surface 52a and the rear-side surface 52c of the lens portion 52 are curved surfaces. As shown in FIG. 17, light rays entering the lens portion 52 are refracted twice before going out of the lens portion 52. Therefore, the light rays can be largely refracted within a short optical distance as compared to a display device in which only one of the surfaces is a curved surface. Thus, even when the radius of curvature of the viewer-side surface 52a and the rear-side surface 52c of the lens portion 52 is greater than that of a display device in which only one of the surfaces is a curved surface, substantially equal optical characteristics can be achieved. Therefore, the thickness and the weight of the lens portion 52 can be reduced.

When both surfaces of the lens portion 52 are curved surfaces, both a line of intersection between the viewer-side surface 52a and a plane which is perpendicular to the display surface 10a and a line of intersection between the rear-side surface 52c and a plane which is perpendicular to the display surface 10a may be circular arcs. Alternatively, at least one of these intersection lines may be a curve which is defined by an aspherical function. Alternatively, at least one of the viewer-side surface 52a and the rear-side surface 52c may be another free curved surface (see WO 2009/157161). The entire disclosure of WO 2009/157161 is incorporated by reference in this specification.

Figure 18:
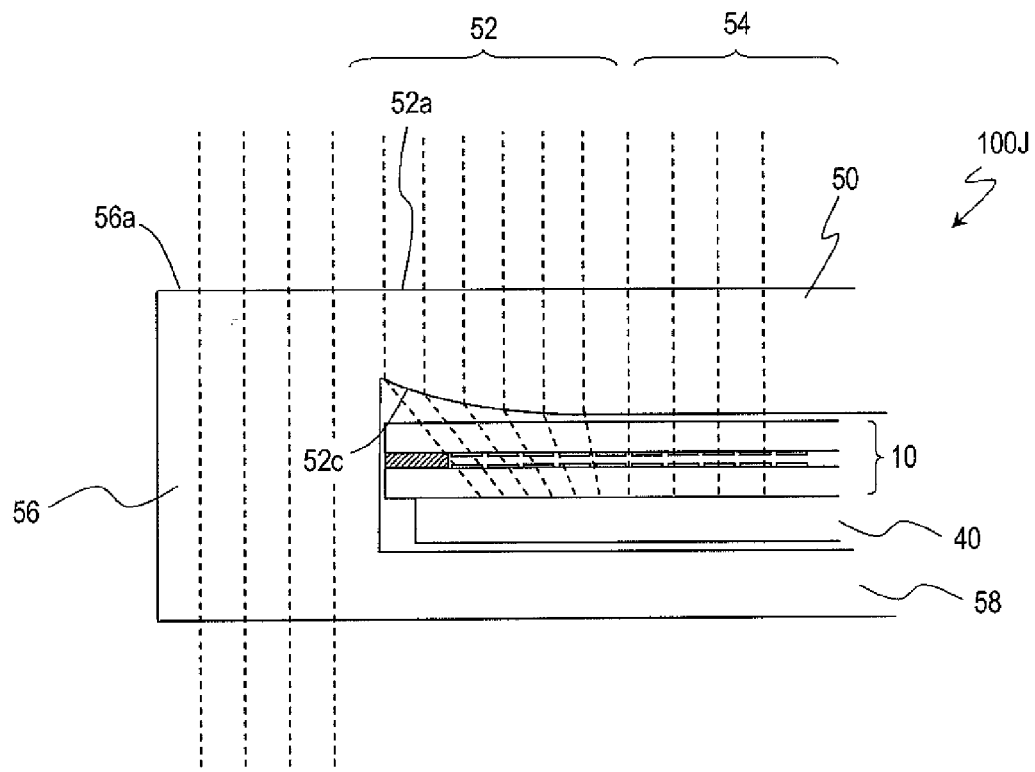
FIG. 18 An enlarged cross-sectional view schematically showing part of the liquid crystal display device 100J near an edge portion.

As in a liquid crystal display device 100J shown in FIG. 18, only the rear-side surface 52c of the lens portion 52 may be a curved surface, while the viewer-side surface 52a may be a flat surface. The liquid crystal display device 100J has an advantage that dust and dirt on the viewer-side surface 52a can be wiped away more easily.

Figure 19:
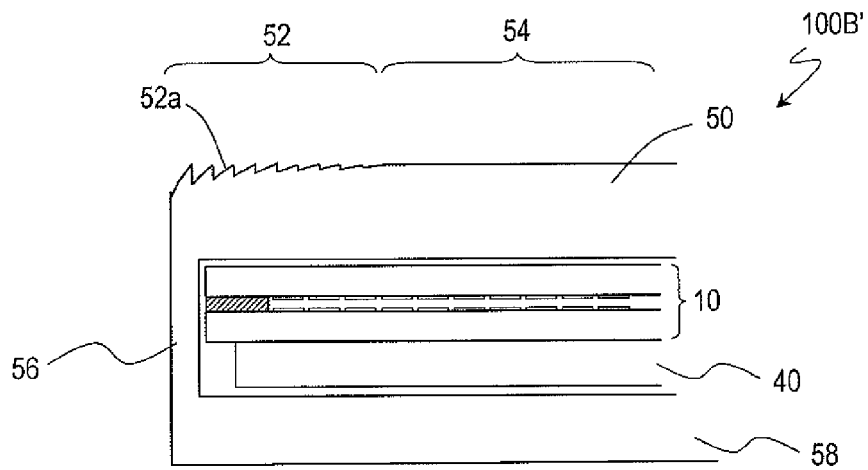
FIG. 19 An enlarged cross-sectional view schematically showing part of the liquid crystal display device 100B' near an edge portion.
Figure 20:
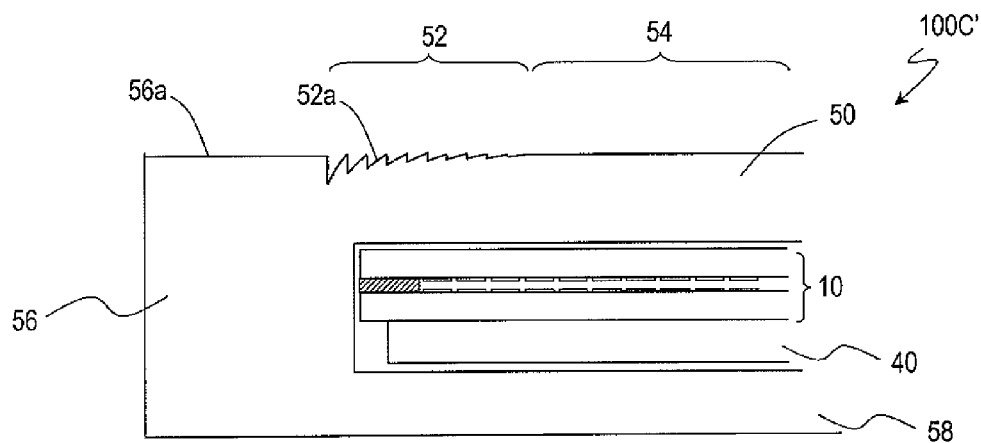
FIG. 20 An enlarged cross-sectional view schematically showing part of the liquid crystal display device 100C' near an edge portion.
Figure 21:
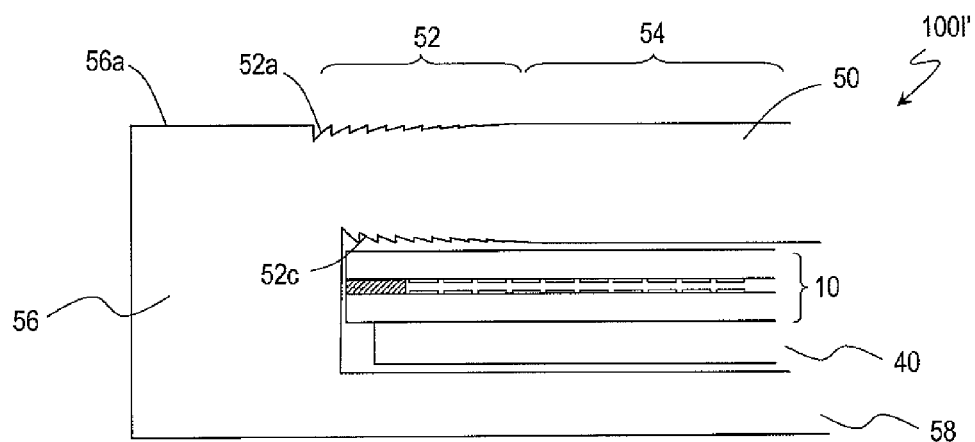
FIG. 21 An enlarged cross-sectional view schematically showing part of the liquid crystal display device 100I' near an edge portion.

Although the curved lens surface examples have been described, the lens surfaces may not be curved surfaces. For example, at least one of the viewer-side surface 52a and the rear-side surface 52c of the lens portion 52 may be a Fresnel lens. FIG. 19 to FIG. 21 are schematic enlarged cross-sectional views of an edge portion of a display device which has a Fresnel lens surface.

A liquid crystal display device 100B' shown in FIG. 19 is different from the liquid crystal display device 100B (see FIG. 5) in that the viewer-side surface 52a of the lens portion 52 is a Fresnel lens surface. A liquid crystal display device 100C' shown in FIG. 20 is different from the liquid crystal display device 100C (see FIG. 8) in that the viewer-side surface 52a of the lens portion 52 is a Fresnel lens surface. A liquid crystal display device 100I' shown in FIG. 21 is different from the liquid crystal display device 100I (see FIG. 17) in that the viewer-side surface 52a and the rear-side surface 52c of the lens portion 52 are Fresnel lens surfaces.

In the liquid crystal display devices 100B' (FIG. 19), 100C' (FIG. 20), and 100I' (FIG. 21), the lens portion has a Fresnel lens surface. Therefore, the thickness and the weight of these display devices are advantageously smaller than those of the liquid crystal display devices 100B (FIG. 5), 100C (FIG. 8), and 100I (FIG. 17), respectively. Further, since the viewer-side surface 52a of the lens portion 52 is a Fresnel lens surface, the lens portion 52 seemingly has a nearly flat surface, which is preferred in terms of design as compared with a case where it is a curved surface (see WO 2009/066436). The entire disclosure of WO 2009/066436 is incorporated by reference in this specification.

If the interval between adjacent grooves of the Fresnel lens surface is different from the interval between adjacent pixels of the display region 10A, occurrence of moiré fringes can preferably be prevented. For example, when the interval between adjacent pixels is 100 μm, it is preferred that the interval between grooves of the Fresnel lens surface is not more than 20 μm or not less than 200 μm.

Figure 22:
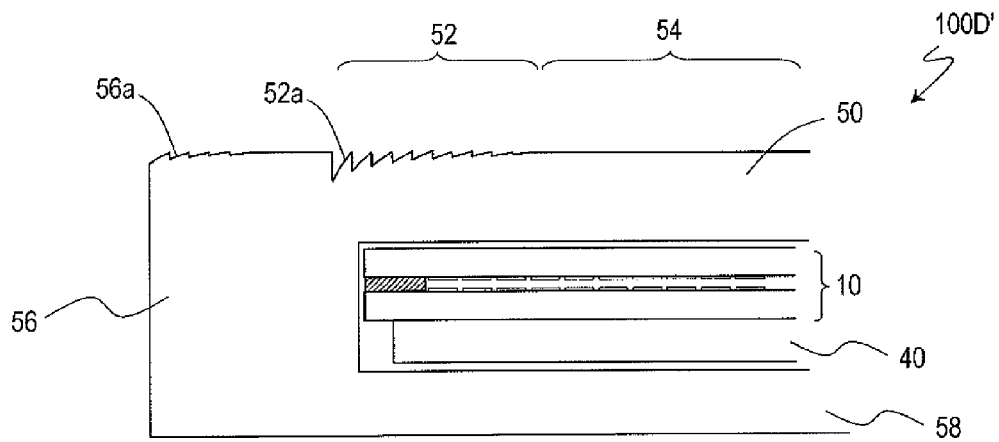
FIG. 22 An enlarged cross-sectional view schematically showing part of the liquid crystal display device 100D' near an edge portion.
Figure 23:
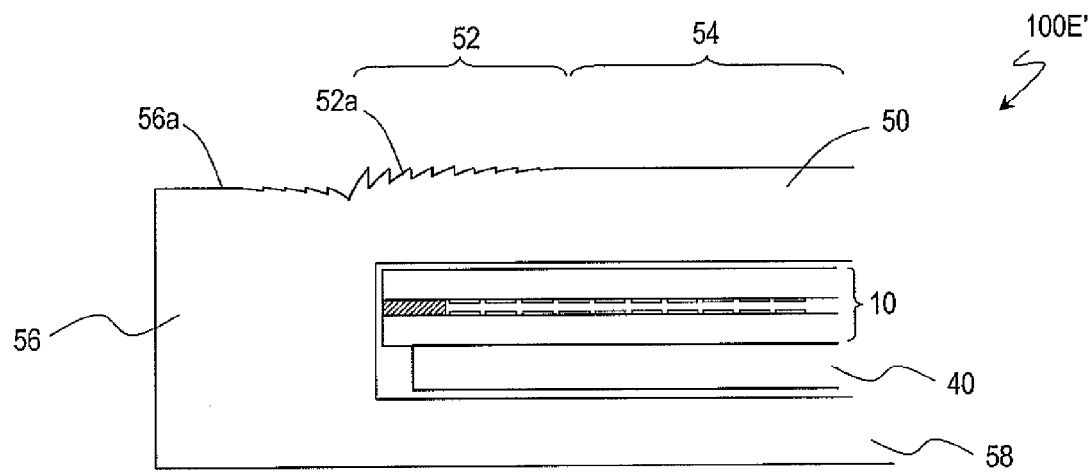
FIG. 23 An enlarged cross-sectional view schematically showing part of the liquid crystal display device 100E' near an edge portion.

Even when at least one of the viewer-side surface 56a and the rear-side surface 56c of the lateral housing portion 56 is a lens surface, these may be Fresnel lens surfaces (FIGS. 22 and 23). A liquid crystal display device 100D' shown in FIG. 22 is different from the liquid crystal display device 100D (FIG. 10) in that the viewer-side surface 56a of the lateral housing portion 56 and the viewer-side surface 52a of the lens portion 52 are Fresnel lens surfaces. A liquid crystal display device 100E' shown in FIG. 23 is different from the liquid crystal display device 100E (FIG. 11) in that the viewer-side surface 56a of the lateral housing portion 56 and the viewer-side surface 52a of the lens portion 52 are Fresnel lens surfaces. The thickness and the weight of the liquid crystal display device 100D' and the liquid crystal display device 100E' are smaller than those of the liquid crystal display device 100D and the liquid crystal display device 100E, respectively.

The lens-integrated housing 50 which as a Fresnel lens surface may be formed by, for example, injection molding with the use of a mold having a surface in which a Fresnel lens surface is formed by a cutting technique.

Figure 24:
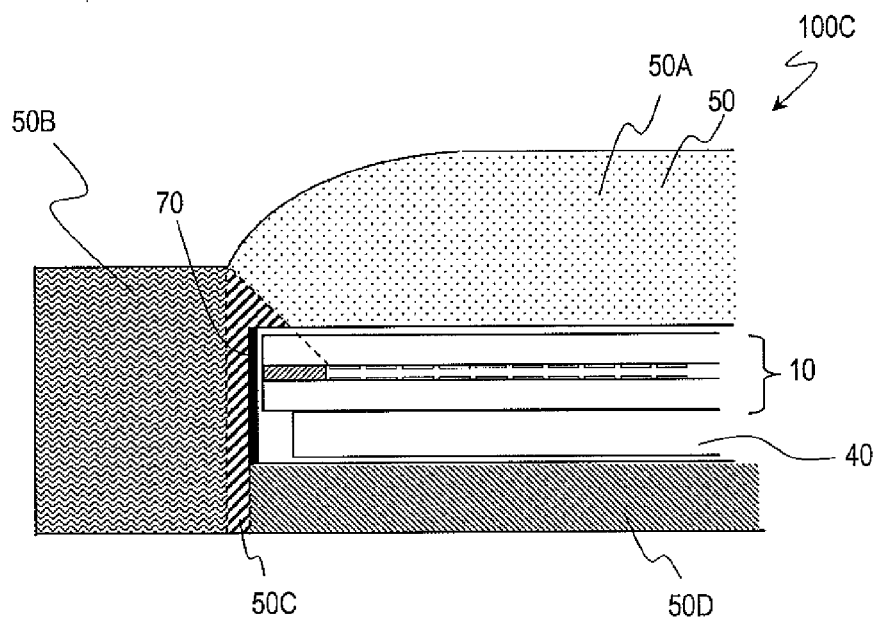
FIG. 24 An enlarged cross-sectional view schematically showing part of the liquid crystal display device 100C near an edge portion.

The liquid crystal display devices 100B to 100J of the above embodiments have the lens-integrated housing 50 into which the lateral housing portion 56, the bottom housing portion 58, the lens portion 52, and the flat portion 54 are integrated. However, these components may be provided as separate elements and combined together for use. For example, the liquid crystal display panel 10 may be sandwiched by a plurality of elements and secured with screws, nail structures, adhesive tapes, or the like. When a plurality of elements are combined together for use instead of the lens-integrated housing 50, the elements may have different transparencies as will be described below. The transparency of the lateral housing portion 56, the bottom housing portion 58, the lens portion 52, and the flat portion 54 is described with reference to FIG. 24, with an example of the liquid crystal display device 100C (see, for example, FIG. 8). A region through which light rays going out from the pixels of the liquid crystal display device 100C are allowed to pass (which is designated by 50A) preferably has high transparency. The outer portion of the lateral housing portion 56 through which light rays entering the lateral housing portion 56 on its rear side are allowed to pass (50B) preferably has high transparency. Part of the lateral housing portion 56 and the lens portion 52 through which light rays traveling toward the viewer are not allowed to pass (50C) and a rear side portion of the backlight device 40 (50D) may not be transparent.

To visually obscuring the side surface of the liquid crystal display panel 10 from a viewer viewing the liquid crystal display device 100C in an oblique direction or a side direction, for example, a black film 70 or the like may be provided outside the side surfaces of the liquid crystal display panel 10 and the backlight device 40. The film 70 may not be black. Alternatively, a separate element, such as a film, may not be provided, while a material may be directly printed on a side surface of the lateral housing portion 56 which is closer to the display panel.

The lateral housing portion 56, the bottom housing portion 58, the lens portion 52, and the flat portion 54 can be manufactured using, for example, an acrylic or polycarbonate material, by injection molding or the like. Note that the above-described portions which do not contribute to display may be formed using an ABS resin, or the like, which can readily processed.

Figure 25:
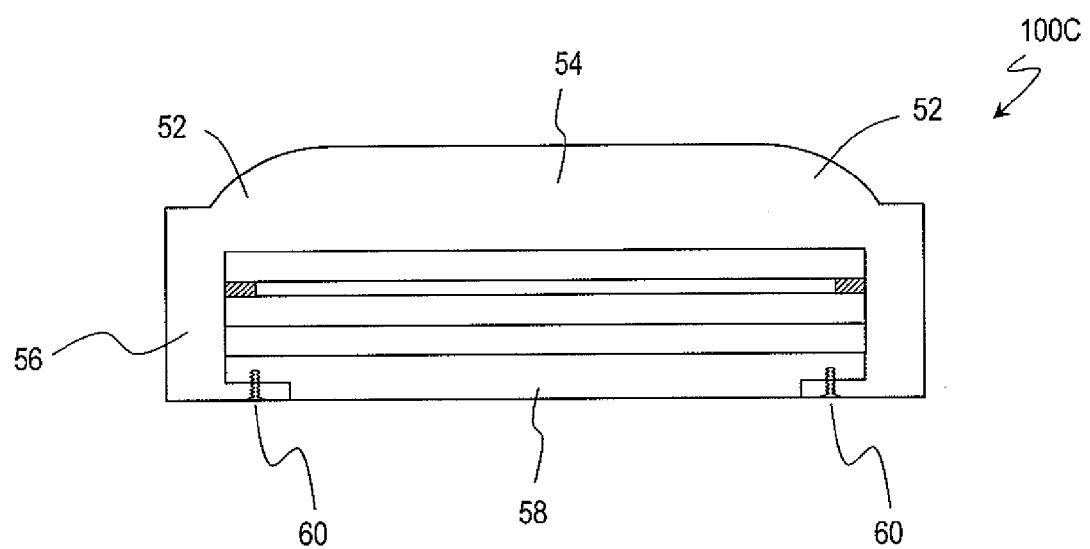
FIG. 25 A schematic cross-sectional view of the liquid crystal display device 100C.

When a plurality of elements are combined together for use, an element which has the lens portion 52, the flat portion 54 and the lateral housing portion 56 and the bottom housing portion 58 are secured to each other using, for example, screws 60 (FIG. 25). Alternatively, the respective elements may have nail-like structures for securing themselves to one another. A transparent adhesive tape may be used for securing the elements to one another. When a non-transparent material is used for securing them to one another, for example, securing the elements on the rear side of the lateral housing portions affects the rear environment which is visible therethrough to a viewer. Therefore, it is preferred that the elements are secured to one another on the rear side of the liquid crystal display device 100C as shown in FIG. 25. Note that, when a plurality of elements are combined together, all the elements may be transparent from the viewpoint of molding or design.

The light-transmitting cover 20 and the housing 30 of the liquid crystal display device 100A and the lens-integrated housing 50 of the liquid crystal display devices 100B to 100J of the above-described embodiments can be manufactured using, for example, an acrylic or polycarbonate material, by injection molding or the like.

In the previously-described examples of the above embodiments, the viewer-side surface 56a and the rear-side surface 56c of the lateral housing portion 56 are a flat surface or lens surface, although the corner of the lateral housing portion 56 at the intersection of the side surface 56b and the viewer-side surface 56a may have a curved surface for the sake of design or for the convenience of handling.

The above-described examples of the liquid crystal display devices of the embodiments have a rectangular display panel, in which two out of the four sides of the frame of the display device are visually obscured. For example, alternatively, only one side may be visually obscured. Still alternatively, three sides or all the four sides may be visually obscured.

Figure 26:
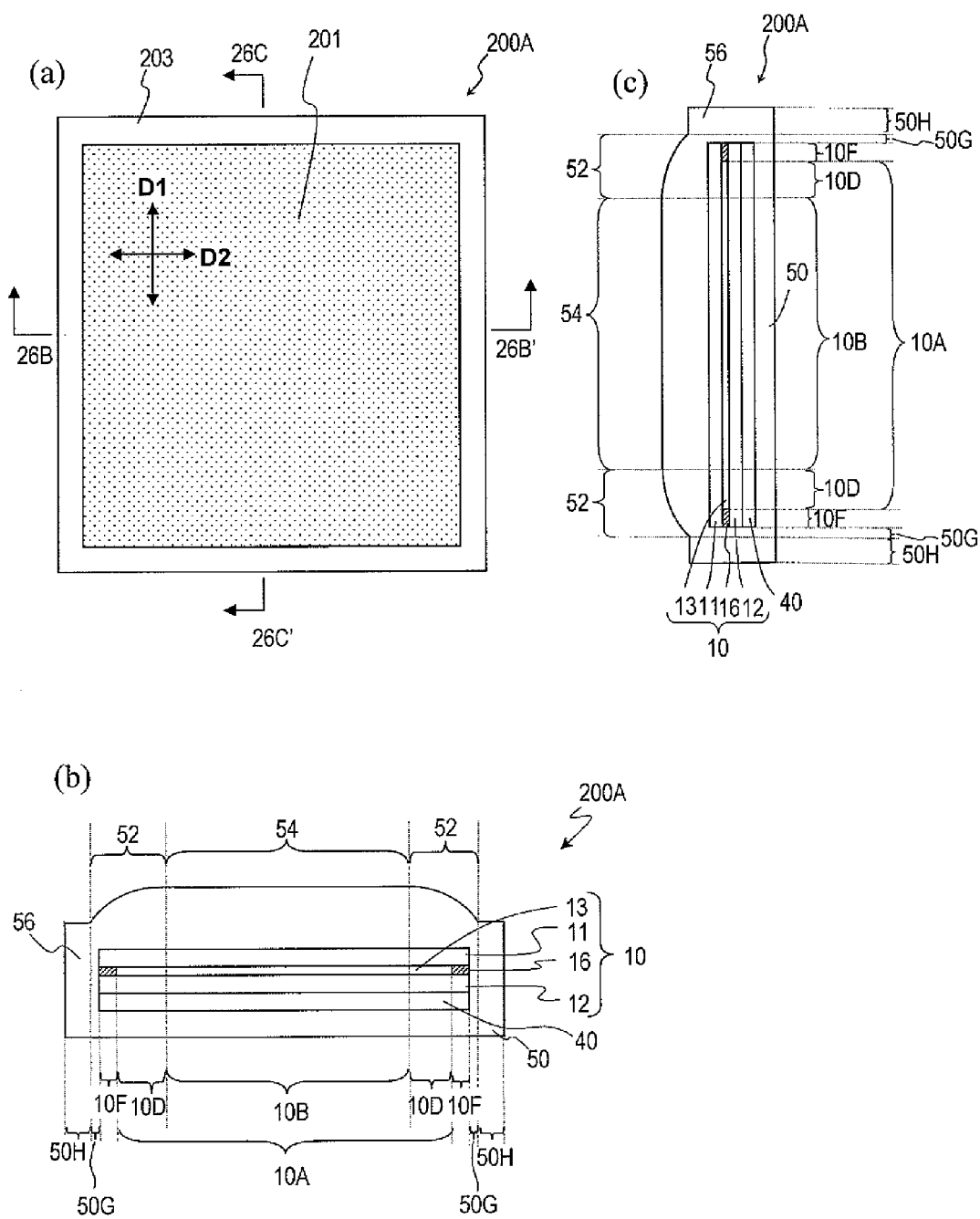
FIG. 26 (a) is a diagram schematically showing a liquid crystal display device 200A, which is seen from the viewer's side. (b) is a cross-sectional view taken along line 26B-26B' of (a). (c) is a cross-sectional view taken along line 26C-26C' of (a).

FIGS. 26(a) to 26(c) shows a liquid crystal display device 200A in which the four sides of the frame are visually obscured. FIG. 26(a) is a schematic diagram of the liquid crystal display device 200A which is seen from the viewer's side. FIGS. 26(b) and 26(c) are schematic cross-sectional views taken along line 26B-26B' and line 26C-26C' of FIG. 26(a). The line 26B-26B' is parallel to the second direction D2, and the line 26C-26C' is parallel to the first direction D1. Therefore, FIG. 26(b) is a cross-sectional view of the liquid crystal display device 200A which is obtained by cutting along the second direction D2. FIG. 26(c) is a cross-sectional view of the liquid crystal display device 200A which is obtained by cutting along the first direction D1.

As shown in FIG. 26(b), the liquid crystal display device 200A includes the lens-integrated housing 50. The lateral housing portion 56 and the lens portion 52 are provided at the two sides of the lens-integrated housing 50 extending in the first direction D1. The lens portion 52 is positioned so as to overlap a region which includes the peripheral display region 10D and the frame region 10F of the liquid crystal display panel 10 and the panel vicinity portion 50G of the lateral housing portion. Therefore, according to the same principle as that applied to the liquid crystal display device 100C (FIG. 7), an image formed in the peripheral display region 10D is enlarged so as to be displayed over a region constituted of the peripheral display region 10D, the frame region 10F, and the panel vicinity portion 50G. In part of the lateral housing portion 56 in which the lens portion 52 is not provided on the viewer's side (the outer portion 50H), the rear environment behind the outer portion 50H is visible therethrough. Therefore, in the case of the liquid crystal display device 200A, the frame portions at the two sides extending in the first direction D1 (the frame region 10F of the liquid crystal display panel 10 and the lateral housing portion 56) are visually obscured.

As shown in FIG. 26(c), the lateral housing portion 56 and the lens portion 52 are also provided at the two sides of the lens-integrated housing 50 extending in the second direction D2 as at the other two sides extending in the first direction D1. Therefore, in the liquid crystal display device 200A, the frame portions at the two sides extending in the second direction D2 (the frame region 10F of the liquid crystal display panel 10 and the lateral housing portion 56) are visually obscured.

FIG. 26(a) shows a region 201 in which an image is to be displayed and a region 203 in which the rear environment is visible therethrough. As described above, with the lens-integrated housing 50 of the liquid crystal display device 200A, part of the image is displayed on the viewer's side of the frame region 10F and the panel vicinity portion 50G provided at the two sides extending in the first direction D1 and at the two sides extending in the second direction D2, while in the outer portions 50H, the rear environment is visible therethrough. Therefore, in the liquid crystal display device 200A, on the frame portions at the four sides, part of the image is displayed or the rear environment is visible therethrough as shown in FIG. 26(a). Thus, in the liquid crystal display device 200A, the frame portions at the four sides are visually obscured.

When the frame portions at the four sides are visually obscured as in the liquid crystal display device 200A shown in FIG. 26(a), the corner between two adjacent sides may be visually obscured. The shape of the lens portion provided at the corner is preferably, for example, part of a body of revolution, as will be described later (see Japanese Patent Application No. 2008-322964). The entire disclosure of Japanese Patent Application No. 2008-322964 is incorporated by reference in this specification. Note that, in this specification, the body of revolution refers to a three-dimensional structure which is obtained by revolving a two-dimensional structure by 360° around a straight line which is present on the same plane as the two-dimensional structure. This straight line is referred to as "revolution axis".

The present invention is applicable to, for example, a display device which includes a circular shape display panel or an oval shape display panel as the display panel. As the circular shape display panel, for example, a known circular shape display panel described in Patent Document 3 may be used.

Figure 27:
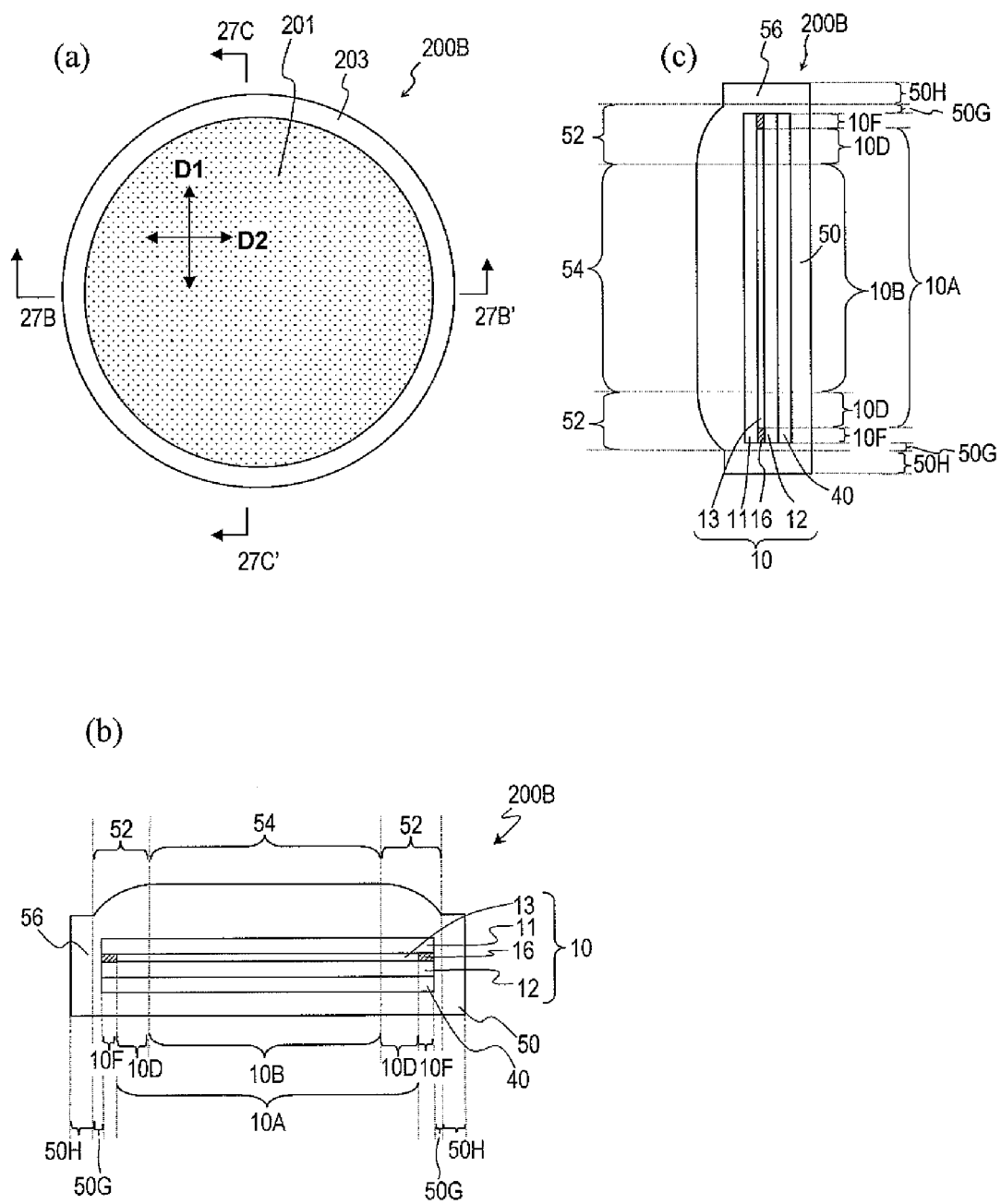
FIG. 27 (a) is a diagram schematically showing a liquid crystal display device 200B, which is seen from the viewer's side. (b) is a cross-sectional view taken along line 27B-27B' of (a). (c) is a cross-sectional view taken along line 27C-27C' of (a).

FIGS. 27(a) to 27(c) show schematic diagrams of a liquid crystal display device 200B which includes a circular shape liquid crystal display panel 10. FIG. 27(a) is a schematic diagram of the liquid crystal display device 200B which is seen from the viewer's side. FIGS. 27(b) and 27(c) are schematic cross-sectional views respectively taken along line 27B-27B' and line 27C-27C' of FIG. 27(a). Line 27B-27B' is parallel to the second direction D2, and line 27C-27C' is parallel to the first direction D1. Therefore, FIG. 27(b) is a cross-sectional view of the liquid crystal display device 200B taken along the second direction D2. FIG. 27(c) is a cross-sectional view of the liquid crystal display device 200B taken along the first direction D1.

The lens-integrated housing 50 of the liquid crystal display device 200B has a circular shape. The lateral housing portion 56 and the lens portion 52 are provided along the circumference of the lens-integrated housing 50. As seen from FIGS. 27(b) and 27(c), the lens portion 52 is positioned so as to overlap the peripheral display region 10D and the frame region 10F of the liquid crystal display panel 10 and the panel vicinity portion 50G of the lateral housing portion 56. Since both the liquid crystal display panel 10 and the lens-integrated housing 50 of the liquid crystal display device 200B are circular, any cross section of the liquid crystal display device 200B taken along a direction different from the first direction D1 and the second direction D2 has the same configuration as those schematically shown in FIGS. 27(b) and 27(c). Therefore, according to the same principle as that applied to the liquid crystal display device 100C (FIG. 7), an image formed in the peripheral display region 10D is enlarged so as to be displayed over a region constituted of the peripheral display region 10D, the frame region 10F, and the panel vicinity portion 50G. In part of the lateral housing portion 56 in which the lens portion 52 is not provided on the viewer's side (the outer portion 50H), the rear environment behind the outer portion 50H is visible therethrough.

Therefore, as in a region 201 in which an image is to be displayed and a region 203 in which the rear environment is visible therethrough as illustrated in FIG. 27(a), in the circular frame of the liquid crystal display device 200B (the frame region 10F and the lateral housing portion 56), part of the image is displayed, or the rear environment is visible therethrough. Thus, in the circular liquid crystal display device 200B, the circular frame is visually obscured.

In the liquid crystal display device 200A (FIG. 26) and the liquid crystal display device 200B (FIG. 27) which have been described above, an image of the rear environment which is obtained by CCD or the like is displayed in the display region, whereby the display device can be made as if the display device did not exist there. The technique of obscuring an object such that a viewer cannot visually recognize the object is sometimes called "active camouflage".

The viewer-side surface of the light-transmitting cover 20, the viewer-side surface of the lateral housing portions 36, and the viewer-side surface of the lens-integrated housing 50 are preferably provided with an antireflection treatment. For example, the surface reflection can be reduced by forming a thin film layer which has a different refractive index from that of the lens-integrated housing 50 through, for example, a deposition or coating step (which is also called "LR treatment"). Alternatively, an antireflection film (or "AR film") which is formed by multiple dielectric films or an antireflection film which has a motheye structure may be attached. Note that, when the surface is a Fresnel lens surface, an antireflection treatment can be provided through, for example, a coating step by means of deposition, dip coating, etc.

Since the image formed in the peripheral display region 10D is enlarged by the lens portion so as to be displayed over a region constituted of the frame region 10F and the peripheral display region 10D, it is preferred that the image formed in the peripheral display region 10D is compressed relative to the image formed in the central display region 10B. Examples of the technique of compressing the image include forming a compressed image in the peripheral display region 10D by compressing display signals which are to be supplied to the pixels arrayed in the peripheral display region 10D, and changing the interval of the pixels in the peripheral display region 10D (see Japanese Patent Application No. 2008-322964).

The image formed in the peripheral display region 10D is enlarged by the lens portion 52, so that the luminance decreases according to the rate of enlargement. Therefore, a difference in luminance may sometimes occur between the image displayed on the lens portion 52 and the image displayed on the flat portion 54. Such a difference in luminance can be improved by increasing the luminance of light entering the lens portion 52 relative to the luminance of light entering the flat portion 54. For example, the luminance difference can be improved by making the transmittance of the pixels in the central display region 10B lower than that of the pixels in the peripheral display region 10D or by making the luminance of light going out from the pixels in the peripheral display region 10D higher than the luminance of light going out from the pixels in the central display region 10B (Japanese Patent Application No. 2008-322964).

Figure 28:
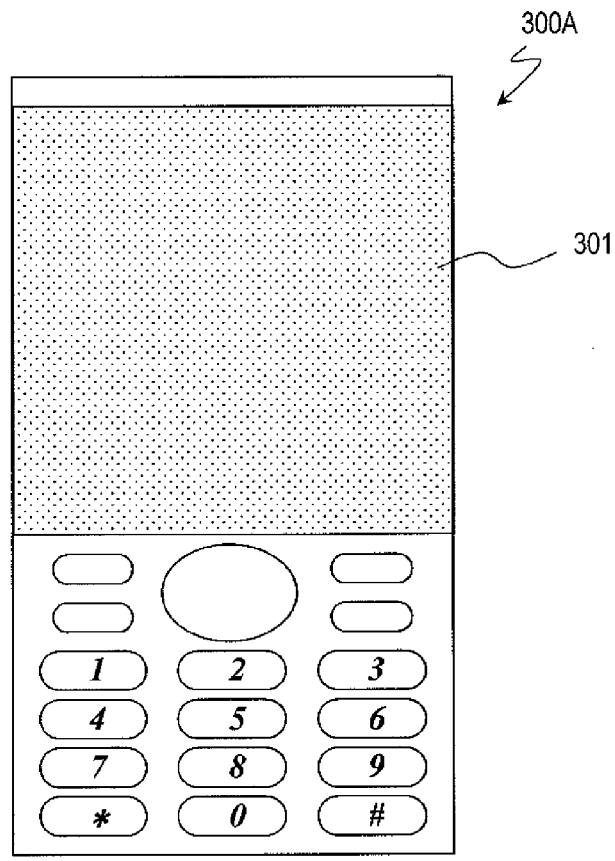
FIG. 28 A diagram schematically showing a mobile phone 300A.

The present invention may be applied to a mobile phone. FIG. 28 shows a schematic diagram of a mobile phone 300A of an embodiment of the present invention. At the two sides extending in a direction perpendicular to the horizontal direction of the display surface of the mobile phone 300A, lens portions are provided such that their outer edges are present on the viewer's side of an outer end surfaces of the housing. Here, in the mobile phone 300A, according to the same principle as that applied to the liquid crystal display device 100B (FIG. 4), an image is displayed in frame portions at the two sides extending in a direction perpendicular to the horizontal direction of the display surface (regions including frame regions and lateral housing portions). That is, in the mobile phone 300A, the frame portions at the two sides extending in the direction perpendicular to the horizontal direction of the display surface are visually obscured (a region 301 in which the image shown in FIG. 28 is displayed).

The liquid crystal display devices of the above-described embodiments may be used as a digital photo frame. With the lens portions 52 provided at the four sides such that an image can be displayed up to the edges of the display device (e.g., the lens portions 52 of the liquid crystal display device 100B), a digital photo frame which displays an image over the entire surface is realized.

When the display device is used as a digital photo frame, an image of a frame may be displayed on the lens portion 52. By displaying the image of the frame on the lens portion 52, a digital photo frame of a novel configuration whose frame design is freely changeable is realized.

Figure 29:
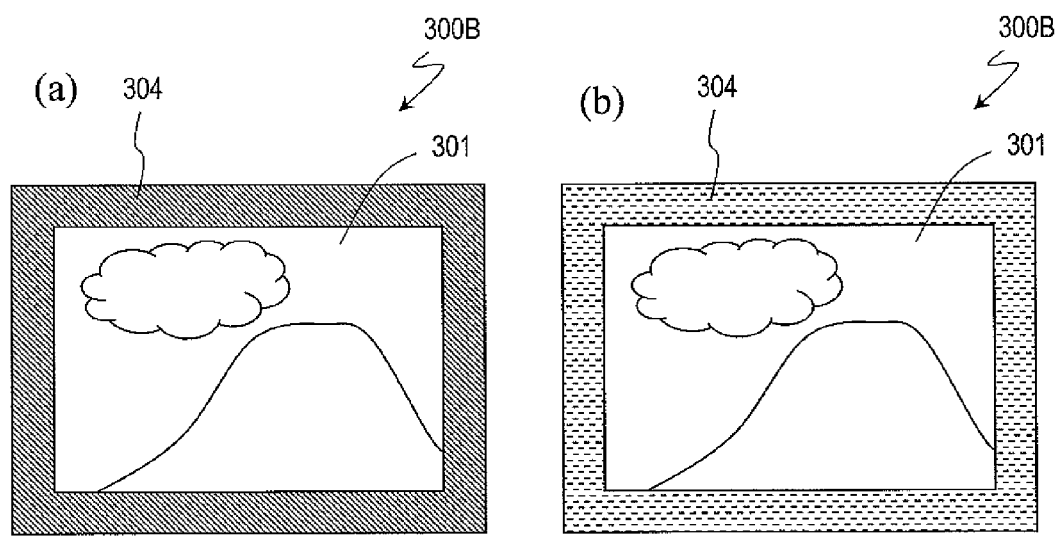
FIGS. 29 (a) and (b) are diagrams schematically showing a digital photo frame 300B.

FIGS. 29(*a*) and 29(*b*) show a digital photo frame 300B in which an image of the frame is displayed on the lens portion 52. As shown in FIGS. 29(*a*) and 29(*b*), different frame images can be displayed in a region 304 extending over the lens portion of the digital photo frame 300B. The digital photo frame 300B is advantageous in that the frame design is freely changeable, although such a change of the frame is not possible in the conventional digital photo frames. The digital photo frame 300B offers an enjoyable use such that, for example, the frame design is changed according to an image displayed at the center. Alternatively, only the image of the frame may be changed while the image at the center (the image displayed in the region 301 in FIGS. 29(*a*) and 29(*b*)) is kept unchanged. In this way, a user can select a favorite frame suitable to the image at the center. To the contrary, only the image at the center may be changed while the image of the frame is kept unchanged.

The displaying of the image of the frame on the lens portion 52 is realized by, for example, supplying display signals for the image of the frame to the pixels arrayed in the peripheral display region 10D. For example, it can readily be realized, without changing a conventional circuit configuration, by processing an image displayed in the display device by software as a combination of an image which is to be displayed at the center and an image of the frame. Alternatively, an additional driving circuit may be provided for supplying display signals to the pixels in the peripheral display region 10D, such that these pixels can be driven independently of the pixels in the central display region 10B. With this configuration, the frame can be freely changed irrespective of the image displayed at the center.

The width of the frame of the digital photo frame 300B can readily be changed. For example, the width of the frame can be made greater than the width of the lens portion 52 by, for example, supplying display signals for the image of the frame to the pixels arrayed in a region which includes the peripheral display region 10D and part of the central display region 10B adjoining the peripheral display region 10D.

When the digital photo frame 300B includes, for example, a backlight device, light of different intensities are emitted from the backlight device to the peripheral display region 10D and the central display region 10B, whereby the image of the frame and the image displayed at the center can have different luminances.

Note that such an arrangement that the image displayed on the lens portion (the image displayed in the peripheral display region) and the image displayed on the flat portion (the image displayed in the central display region) are images of different content types as in the digital photo frame 300B is also applicable to the above-described mobile phone and the above-described liquid crystal display devices.

As a matter of course, any information other than the image of the frame, such as ornamental patterns, characters, date and time, simple text messages, etc., may be displayed on the lens portion 52.

The region in which the image of the frame is to be displayed (a region including the peripheral display region 10D and an area surrounding the peripheral display region 10D) and the region in which the center image is to be displayed (the central display region 10B) may have different resolutions of the pixels. For example, when the image of the frame is a simple ornamental pattern or the like, the resolution of the peripheral display region 10D may be decreased. When a text message is displayed in a small font size, the resolution of the peripheral display region 10D may be increased.

When the frame portions at the four sides are visually obscured as in the liquid crystal display device 200A (FIG. 26), the corner between two adjacent sides may be visually obscured as mentioned above. Hereinafter, a configuration of part of the lens portion which is provided on the viewer's side of the corner of the liquid crystal display panel such that the corner between two adjacent sides is visually obscured is described with reference to FIG. 30 to FIG. 32.

Figure 30:
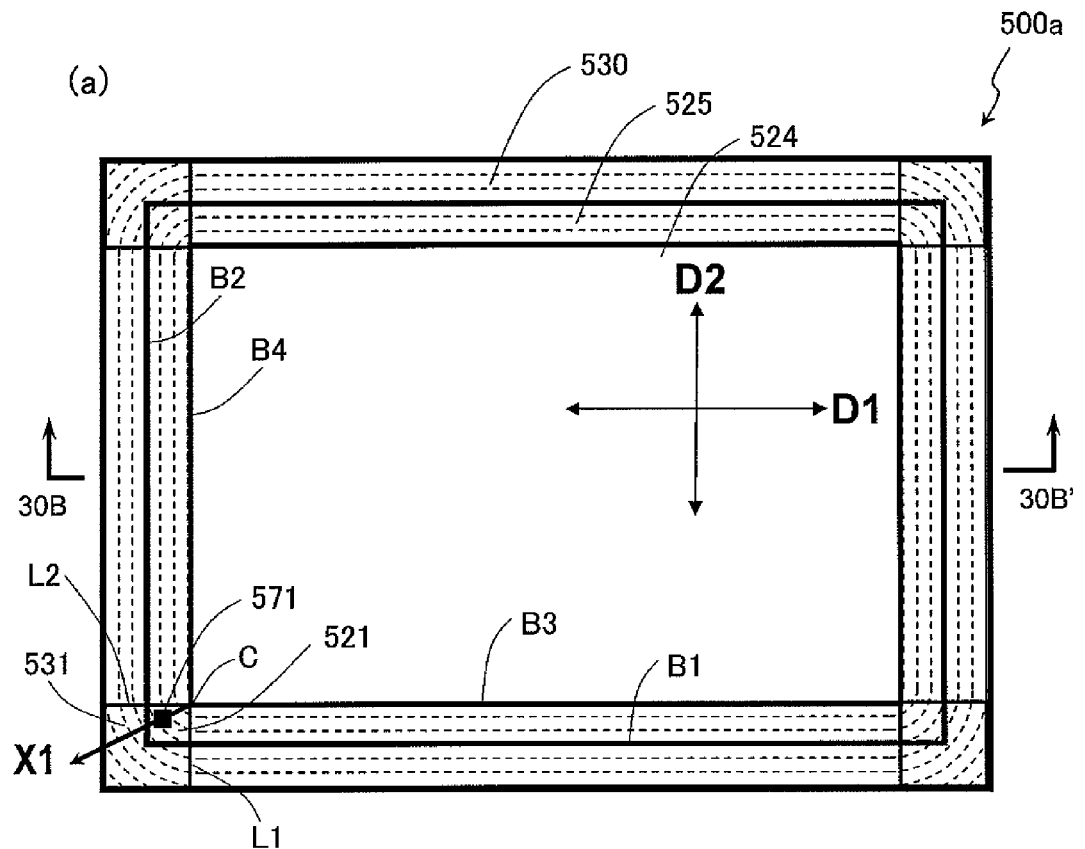
FIGS. 30 (a) and (b) are diagrams schematically showing the configuration of a liquid crystal display device 500a. (a) is a schematic plan view. (b) is a schematic cross-sectional view taken along line 30B-30B' of (a).
Figure 30:
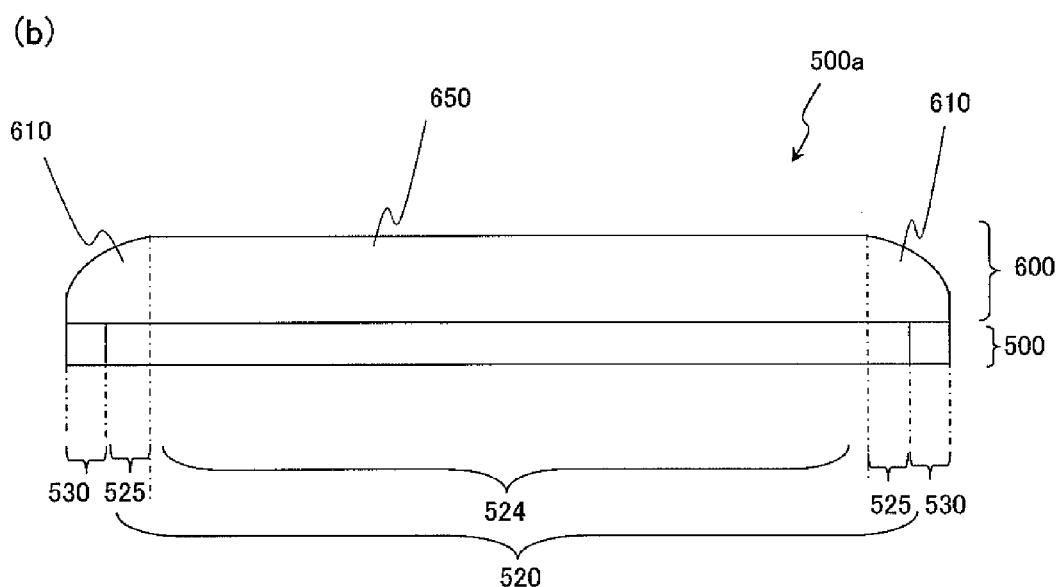

FIGS. 30(*a*) and 30(*b*) show the configuration of the liquid crystal display device 500*a*. FIG. 30(*a*) is a schematic plan view. FIG. 30(*b*) is a schematic cross-sectional view taken along line 30B-30B' of FIG. 30(*a*).

As shown in FIGS. 30(*a*) and 30(*b*), the liquid crystal display device 500*a* includes a liquid crystal display panel 500 and a light-transmitting cover 600 which is provided on the viewer's side of the liquid crystal display panel 500. The liquid crystal display panel 500 includes a display region 520 in which a plurality of pixels are arranged in a matrix of rows and columns and a frame region 530 which is provided outside the display region 520. The display region 520 is constituted of a peripheral display region 525 that adjoins the frame region 530 and a central display region 524 that forms part of the display region 520 other than the peripheral display region 525. The light-transmitting cover 600 includes a flat portion 650 and a lens portion 610.

The peripheral display region 525 of the liquid crystal display panel 500 refers to part of the display region 520 in which the lens portion 610 of the light-transmitting cover 600 is provided at the viewer's side. The flat portion 650 is provided on the central display region 524. Light going out from the peripheral display region 525 is refracted by the lens portion 610 such that an image formed in the peripheral display region 525 is enlarged so as to be displayed over a region constituted of the peripheral display region 525 and the frame region 530.

Here, the row direction is referred to as "first direction D1", and the column direction is referred to as "second direction D2". Between the display region 520 and the frame region 530, there are a first boundary line B1 extending in the first direction D1 and a second boundary line B2 intersecting with the first boundary line B1 and extending in the second direction D2. Between the peripheral display region 525 and the central display region 524, there are a third boundary line B3 extending in the first direction D1 and a fourth boundary line B4 intersecting with the third boundary line B3 and extending in the second direction D2.

The peripheral display region 525 includes a first peripheral display portion 521 which is enclosed by a line L1, a line L2, the first boundary line B1, and the second boundary line B2. The line L1 is a line which passes through the point C where the third boundary line B3 and the fourth boundary line B4 intersect with each other and which is perpendicular to the first boundary line B1. The line L2 is a line which passes through the point C and which is perpendicular to the second boundary line B2.

The frame region 530 includes a first frame portion 531 which adjoins the first peripheral display portion 521 at the first boundary line B1 and the second boundary line B2. The first frame portion 531 is a portion which is defined by the first boundary line B1, the second boundary line B2, the line L1 and the line L2, and the perimeter of the liquid crystal display panel 500.

The lens portion 610 of the light-transmitting cover 600 has a curved surface as shown in FIG. 30(*b*). In FIG. 30(*a*), the curvature of the surface (viewer-side surface) of the lens portion 610 is expressed by contour lines. Note that, here, the interval of the contour lines is constant for the sake of simplicity, although the present invention is not limited to this example. A preferred shape of the viewer-side surface of the lens portion 610 will be described later.

As described above, the lens portion 610 of the light-transmitting cover 600 of the liquid crystal display device 500*a* is configured to refract light going out from the peripheral display region 525 such that an image formed in the peripheral display region 525 is enlarged so as to be displayed over a region constituted of the peripheral display region 525 and the frame region 530. Part of the lens portion 610 which are provided on the viewer's side of the corners of the liquid crystal display panel 500 (referred to as "first lens sections") are configured to refract a light ray going out from a pixel 571 that is in the first peripheral display portion 521 along a direction from the point C to the pixel 571, i.e., along the direction X1, as shown in FIG. 30(*a*). Likewise, light rays going out from the pixels arrayed in the first peripheral display portion 521 are refracted along directions from the point C to the respective pixels. Therefore, when an image is observed in a direction perpendicular to the display surface of the liquid crystal display device 500*a*, an image formed in the first peripheral display portion 521 of the liquid crystal display panel 500 is enlarged so as to be displayed over a region constituted of the first peripheral display portion 521 and the first frame portion 531. Thus, part of the lens portion 610 provided over the first peripheral display portion 521 and the first frame portion 531 (the first lens section) refracts light going out from the first peripheral display portion 521 along a direction which is not identical with the horizontal direction D1 or the vertical direction D2, e.g., X1, so that the first frame portion 531 is visually obscured.

Hereinafter, the configuration is more specifically described with reference to FIG. 31 and FIG. 32.

Figure 31:
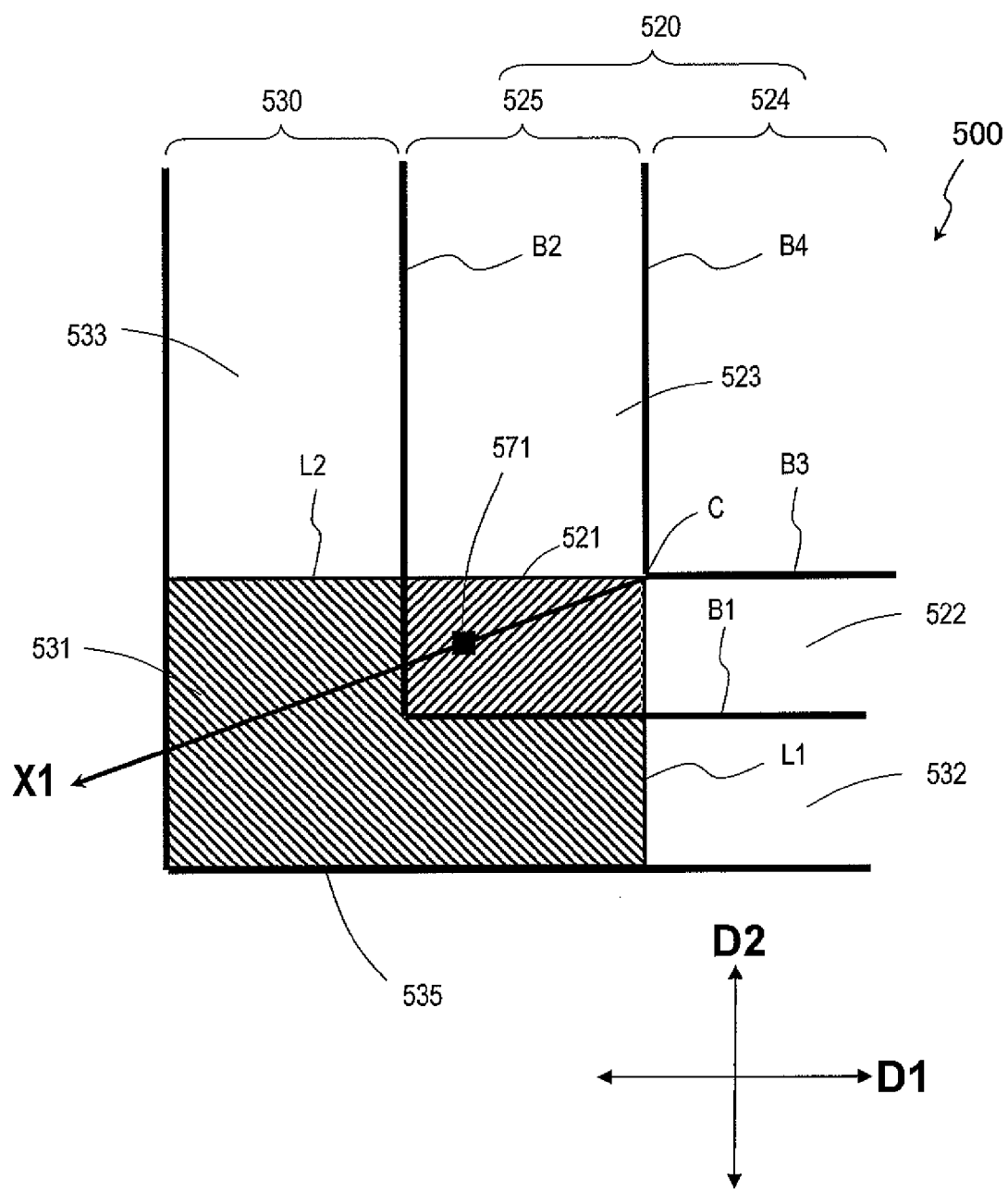
FIG. 31 is a schematic top view of an edge portion of a liquid crystal display panel 500.

FIG. 31 is an enlarged top view schematically showing part of the liquid crystal display panel 500 in the vicinity of a corner portion. As shown in FIG. 31, there are the first boundary line B1 and the second boundary line B2 between the display region 520 and the frame region 530, and there are the third boundary line B3 and the fourth boundary line B4 between the peripheral display region 525 and the central display region 524. The first peripheral display portion 521 is a portion which is enclosed by the line L1, the line L2, the first boundary line B1, and the second boundary line B2. The first frame portion 531 is part of the frame region 530 which is enclosed by the line L1, the line L2, the first boundary line B1, the second boundary line B2, and an outer edge 535 of the frame region 530.

Figure 32:
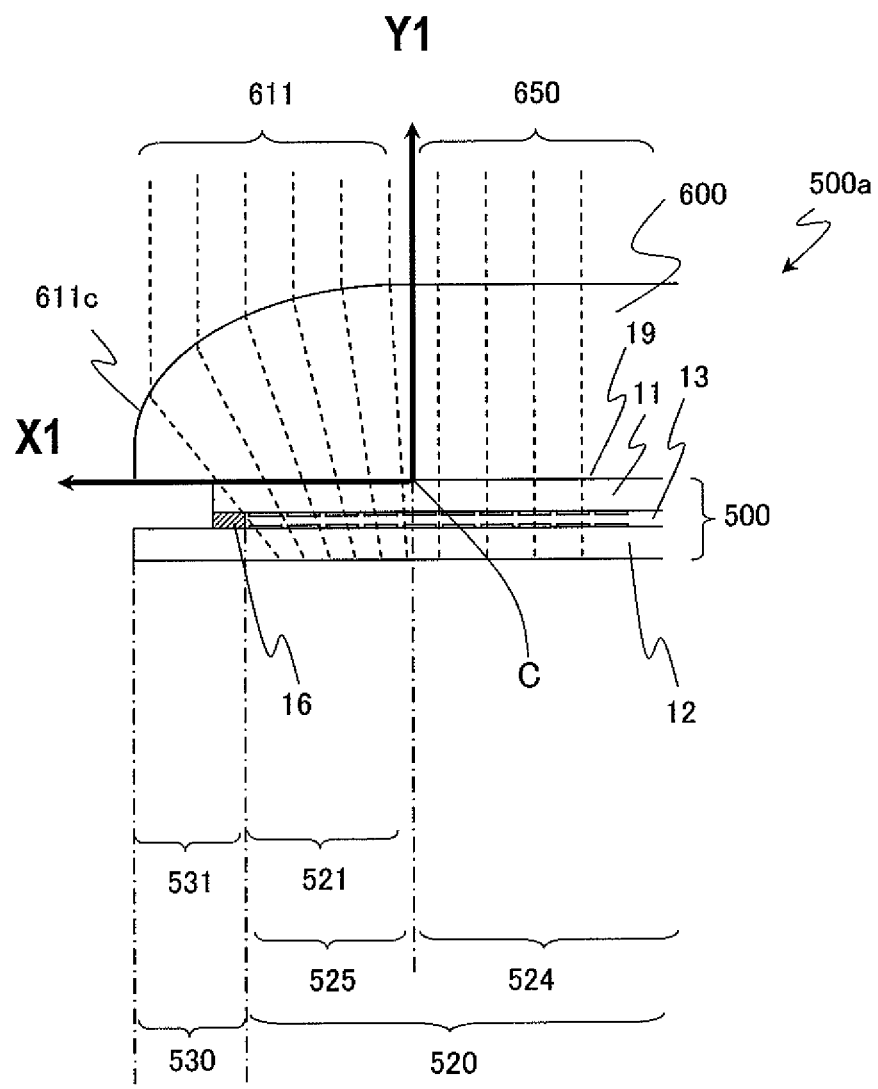

Next, refer to FIG. 32. FIG. 32 is a cross-sectional view of the liquid crystal display device 500*a* in a X1-Y1 plane. Here, Y1 axis is an axis which passes through the point C shown in FIG. 31 and which is perpendicular to the display surface 19 of the liquid crystal display panel 500.

In FIG. 32, broken lines represent light rays which go out from the pixels arrayed in the display region 520. As shown in FIG. 32, light rays going out from the pixels arrayed in the first peripheral display portion 521 impinge on a first lens section 611 and are refracted in the direction X1. Here, the light rays that have entered the first lens section 611 are refracted at the viewer-side surface (or "outgoing face") of the first lens section 611 and go out from the viewer-side surface of the first lens section 611. The light rays going out of the viewer-side surface of the first lens section 611 travel straight in a direction perpendicular to the display surface 19. Likewise, light rays going out from the pixels arrayed in the first peripheral display portion 521 are refracted along directions from the point C to the respective pixels. An image formed in the first peripheral display portion 521 of the liquid crystal display panel 500 is enlarged so as to be displayed over a region constituted of the first peripheral display portion 521 and the first frame portion 531. Therefore, when the image is observed in a direction perpendicular to the display surface 19 of the liquid crystal display device 500a, the first frame portion 531 is visually obscured.

FIG. 32 also shows light rays going out from the pixels arrayed in the central display region 524. The outgoing face of the flat portion 650 which is provided over the central display region 524 is parallel to the display surface 19. Light rays going out from the central display region 524 enter the flat portion 650 and travel straight across the flat portion 650 in a direction perpendicular to the display surface 19.

A line of intersection 611c between the viewer-side surface of the first lens section 611 and the X1-Y1 plane is, for example, preferably, a curve defined by an aspherical function described in WO 2009/157150 which has been mentioned above. For example, by designing the first lens section 611 such that the intersection line 611c is a curve defined by the aforementioned aspherical function, an image which is formed in the first peripheral display portion 521 at the image compression rate a relative to an image formed in the central display region 524 can be enlarged by 1/a times so as to be displayed over the viewer-side surface of the first lens section 611. Thus, an undistorted image can be displayed in a region constituted of the first peripheral display portion 521 and the first frame portion 531.

Next, a preferred shape of part of the lens portion 610 which is provided over the first peripheral display portion 521 and the first frame portion 531 (the first lens section 611) is described. The first lens section 611 is, preferably, part of a body of revolution which is obtained by cutting the body of revolution at two planes that include the axis of revolution. Here, this part of the body of revolution is preferably positioned such that the axis of revolution is coincident with Y1 axis. That is, it is preferably positioned such that the axis of revolution passes through the point C and is perpendicular to the third boundary line B3 and the fourth boundary line B4.

When the shape of the first lens section 611 is part of the body of revolution which is obtained by rotating a plane enclosed by the intersection line 611c, the X1 axis, and the Y1 axis shown in FIG. 32 around the Y1 axis that serves as the axis of revolution, a line of intersection between a plane which passes through the Y1 axis and which is perpendicular to the display surface 19, but which is different from the X1-Y1 plane, and the viewer-side surface of the first lens section 611 is a curve which is similar to the intersection line 611c. Here, light rays going out from the other pixels arrayed in the first peripheral display portion 521 than the pixel 571 can also be refracted along directions from the point C to the respective pixels. An image formed in the first peripheral display portion 521 can be enlarged so as to be displayed over a region constituted of the first peripheral display portion 521 and the first frame portion 531.

As described above, in the liquid crystal display device 500a, the first frame portion 531 is visually obscured. Therefore, in the liquid crystal display device 200A shown in FIG. 26, when the corner portions of the lens portion 52 of the lens-integrated housing 50 have the same configuration as the corner portions of the lens portion 610 of the light-transmitting cover 600 of the liquid crystal display device 500a (the first lens section 611), the frame regions at the corner portions of the liquid crystal display panel 10 of the liquid crystal display device 200A are visually obscured. As described with reference to FIG. 26, in the liquid crystal display device 200A, the frame portions at all the four sides are visually obscured. Thus, when the corners of the lens portion 52 have the same configuration as that of the first lens section 611, the entire frame including the corner portions is visually obscured.

As described above, according to the present invention, a direct-viewing type display device can be provided which includes a sole display panel and in which the frame is visually obscured.

INDUSTRIAL APPLICABILITY

The present invention is suitably applicable to a display device for display of information. Particularly, the present invention is preferably applicable to a digital photo frame.

REFERENCE SIGNS LIST 10 liquid crystal display panel
10A display region
10B central display region
10D peripheral display region
10F frame region
10a display surface of display panel
10b side surface of display panel
11 upper substrate
12 lower substrate
13 liquid crystal layer
16 sealing portion
20 light-transmitting cover
22, 52 lens portion
22a, 52a viewer-side surface of lens portion
22c, 52c rear-side surface of lens portion
22d, 52d outer edge of lens portion
24, 54 flat portion
30 housing
36, 56 lateral housing portion
36a, 56a viewer-side surface of lateral housing portion
36b, 56b outer end surface of lateral housing portion
36c, 56c rear-side surface of lateral housing portion
40 backlight device
50 lens-integrated housing
50G panel vicinity portion
50H outer portion
38, 58 bottom housing portion
60 screw
100A liquid crystal display device
101 region in which image is to be displayed
102 region in which frame is visually recognized
103 region in which rear environment is visible therethrough
B1 boundary
D1 first direction
D2 second direction

The invention claimed is:

1. A direct-viewing type display device, comprising:
a display panel which includes a display region and a frame region provided outside the display region in a lateral direction; and
a light-transmitting cover provided on a viewer's side of the display panel; wherein
the light-transmitting cover includes a lens portion positioned so as to overlap a region that includes a portion of the frame region of the display panel and a portion of a peripheral display region within the display region which adjoins the portion of the frame region;
the display device further includes a housing which includes a housing portion provided at least on a lateral side surface of the display panel;
a portion of light going out from the portion of the peripheral display region and/or a portion of light entering the housing portion on a rear side goes out on a viewer's side of the housing portion; and
an outermost lateral end surface of the housing portion is located at a position farther outward in the lateral direction than a corresponding outermost lateral edge of the lens portion of the light-transmitting cover.

2. The display device of claim 1, wherein
the housing portion is capable of transmitting light.

3. A direct-viewing type display device, comprising:
a display panel which includes a display region and a frame region provided outside the display region; and
a light-transmitting cover provided on a viewer's side of the display panel; wherein
the light-transmitting cover includes a lens portion positioned so as to overlap a region that includes a portion of the frame region of the display panel and a portion of a peripheral display region within the display region which adjoins the portion of the frame region;
the display device further includes a housing which includes a housing portion provided at least on a side surface of the display panel;
a portion of light going out from the portion of the peripheral display region and/or a portion of light entering the housing portion on a rear side goes out on a viewer's side of the housing portion;
the lens portion of the light-transmitting cover is arranged such that an outer edge of the lens portion is present on a viewer's side of the outer end surface of the housing portion; and
the housing and the light transmitting cover are integrally defined by a single monolithic member.

4. The display device of claim 1, wherein the housing and the light-transmitting cover are integrally defined by a single monolithic member.

5. The display device of claim 2, wherein
the housing and the light-transmitting cover are integrally defined by a single monolithic member, and
at least a portion of a viewer-side surface and a rear-side surface of the housing portion is a lens surface.

6. The display device of claim 5, wherein
the housing portion is provided such that the viewer-side surface of the housing portion and the viewer-side surface of the lens portion define a boundary therebetween;
the boundary is located on a viewer's side of the portion of the frame region; and
the viewer-side surface of the housing portion is a lens surface.

7. The display device of claim 1, wherein an image formed at least in a portion of the display region which is exclusive of the peripheral display region is an image of a different content type from an image formed in the portion of the peripheral display region.

* * * * *